US009452529B2

(12) United States Patent
Niu

(10) Patent No.: US 9,452,529 B2
(45) Date of Patent: *Sep. 27, 2016

(54) ROBOT, ROBOT CONTROL DEVICE, AND ROBOT SYSTEM

(71) Applicant: Seiko Epson Corporation, Tokyo (JP)

(72) Inventor: Akio Niu, Matsumoto (JP)

(73) Assignee: Seiko Epson Corporation (JP)

( * ) Notice: Subject to any disclaimer, the term of this patent is extended or adjusted under 35 U.S.C. 154(b) by 94 days.

This patent is subject to a terminal disclaimer.

(21) Appl. No.: 14/014,964

(22) Filed: Aug. 30, 2013

(65) Prior Publication Data

US 2014/0067125 A1   Mar. 6, 2014

(30) Foreign Application Priority Data

Aug. 31, 2012  (JP) .................................. 2012-191462

(51) Int. Cl.
  *B25J 9/06*   (2006.01)
  *B25J 9/16*   (2006.01)
  *B25J 13/08*  (2006.01)

(52) U.S. Cl.
  CPC .................. *B25J 9/1651* (2013.01); *B25J 9/06* (2013.01); *B25J 9/1638* (2013.01); *B25J 9/1694* (2013.01); *B25J 13/088* (2013.01); *G05B 2219/37347* (2013.01); *G05B 2219/39195* (2013.01)

(58) Field of Classification Search
  CPC ...... B25J 9/161; B25J 9/1615; B25J 9/1628; B25J 9/1638; B25J 9/1641; B25J 9/1651; B25J 9/1653; B25J 9/1694; B25J 13/088; G05B 19/404; G05B 2219/39195; G05B 2219/39199; G05B 2219/40549; G05B 2219/41128
  See application file for complete search history.

(56) References Cited

U.S. PATENT DOCUMENTS

| 4,882,527 A | 11/1989 | Yakuyama et al. |
| 4,937,759 A | 6/1990 | Vold |
| 5,550,953 A | 8/1996 | Seraji |
| 5,710,870 A | 1/1998 | Ohm et al. |

(Continued)

FOREIGN PATENT DOCUMENTS

| CN | 102501242 A | 6/2012 |
| EP | 2492064 A2 | 8/2012 |

(Continued)

OTHER PUBLICATIONS

"A3G4250D MEMS motion sensor: 3-axis digital output gyroscope," Feb. 2012, St Microelectronics, Doc 022768 Rev 3.*

(Continued)

*Primary Examiner* — Spencer Patton
(74) *Attorney, Agent, or Firm* — Harness, Dickey & Pierce, P.L.C.

(57) ABSTRACT

A robot includes: a base; a first arm rotatably coupled to the base about a first axis of rotation; a second arm rotatably coupled to the first arm about a second axis of rotation, the second axis of rotation being an axis perpendicular to the first axis of rotation or being an axis parallel to an axis perpendicular to the first axis of rotation; a third arm rotatably coupled to the second arm about a third axis of rotation, the third axis of rotation being an axis parallel to the second axis of rotation; a first angular velocity sensor installed to the first arm and having an angular velocity detection axis parallel to the first axis of rotation; and a second angular velocity sensor installed to the third arm and having an angular velocity detection axis parallel to the third axis of rotation.

12 Claims, 12 Drawing Sheets

(56) References Cited

U.S. PATENT DOCUMENTS

| | | |
|---|---|---|
| 5,781,705 A | 7/1998 | Endo |
| 5,944,476 A | 8/1999 | Bacchi et al. |
| 6,216,056 B1 | 4/2001 | Ito et al. |
| 6,343,242 B1 | 1/2002 | Nomura et al. |
| 6,922,034 B2 | 7/2005 | Hirose |
| 7,202,442 B2 | 4/2007 | Nakagiri et al. |
| 7,233,872 B2 | 6/2007 | Shibasaki et al. |
| 7,756,606 B2 | 7/2010 | Nakajima et al. |
| 7,765,023 B2 | 7/2010 | Oaki et al. |
| 8,631,720 B2 | 1/2014 | Nakagiri et al. |
| 2003/0020461 A1 | 1/2003 | Nomura et al. |
| 2003/0178964 A1 | 9/2003 | Challoner |
| 2005/0113973 A1* | 5/2005 | Endo et al. ............. 700/245 |
| 2005/0166413 A1 | 8/2005 | Crampton |
| 2005/0240307 A1 | 10/2005 | Kuroki et al. |
| 2005/0246061 A1 | 11/2005 | Oaki et al. |
| 2006/0113947 A1* | 6/2006 | Taniguchi ............ G05B 19/404 318/652 |
| 2007/0288124 A1 | 12/2007 | Nagata et al. |
| 2008/0246428 A1 | 10/2008 | Shimada |
| 2009/0149993 A1 | 6/2009 | Neki et al. |
| 2010/0089155 A1 | 4/2010 | Sugihara et al. |
| 2010/0113980 A1 | 5/2010 | Herr et al. |
| 2010/0256812 A1 | 10/2010 | Tsusaka et al. |
| 2010/0286823 A1 | 11/2010 | Neki et al. |
| 2010/0318223 A1* | 12/2010 | Motoyoshi et al. .......... 700/253 |
| 2011/0004343 A1* | 1/2011 | Iida ................... 700/253 |
| 2011/0082566 A1 | 4/2011 | Herr et al. |
| 2011/0107866 A1 | 5/2011 | Oka et al. |
| 2011/0257785 A1 | 10/2011 | Nihei et al. |
| 2012/0035763 A1 | 2/2012 | Motoyoshi |
| 2012/0048027 A1 | 3/2012 | Hashiguchi et al. |
| 2012/0126664 A1 | 5/2012 | Ogura et al. |
| 2012/0174317 A1 | 7/2012 | Saracen et al. |
| 2012/0215356 A1 | 8/2012 | Igarashi et al. |
| 2012/0215357 A1 | 8/2012 | Igarashi et al. |
| 2012/0272774 A1 | 11/2012 | Kirihara et al. |
| 2012/0296471 A1 | 11/2012 | Inaba et al. |
| 2013/0041502 A1 | 2/2013 | Shi et al. |
| 2013/0053866 A1 | 2/2013 | Leung et al. |
| 2013/0073086 A1 | 3/2013 | Motoyoshi et al. |
| 2013/0079929 A1 | 3/2013 | Lim et al. |
| 2013/0131864 A1 | 5/2013 | Jody et al. |
| 2013/0204437 A1 | 8/2013 | Koselka et al. |
| 2014/0121837 A1 | 5/2014 | Hashiguchi et al. |
| 2014/0249670 A1 | 9/2014 | Yamane |
| 2014/0316564 A1 | 10/2014 | Nakamura et al. |
| 2015/0081092 A1 | 3/2015 | Jacobsen et al. |
| 2015/0190925 A1 | 7/2015 | Hoffman et al. |
| 2015/0190928 A1 | 7/2015 | Motoyoshi |
| 2016/0008988 A1 | 1/2016 | Kennedy et al. |
| 2016/0015461 A1 | 1/2016 | Farritor et al. |

FOREIGN PATENT DOCUMENTS

| | | |
|---|---|---|
| EP | 2703130 A2 | 3/2014 |
| EP | 2703131 A2 | 3/2014 |
| JP | 60-020214 A | 2/1985 |
| JP | 60-020888 | 2/1985 |
| JP | 01-103279 A | 4/1989 |
| JP | 2007-040766 A | 2/2007 |
| JP | 2007-314026 A | 12/2007 |
| JP | 2011-136395 A | 7/2011 |
| JP | 2012-035361 A | 2/2012 |
| JP | 2012-139770 A | 7/2012 |
| WO | WO-2010-019310 A1 | 2/2010 |

OTHER PUBLICATIONS

Wilcoxon Research, "Vibration sensor wiring and cabling," Aug. 2008.*
Analog Devices, "ADIS16120," 2007, Rev. B.*
Extended European Search Report for Application No. EP 14162332.2 dated Feb. 4, 2016 (9 pages).
Extended European Search Report for Application No. EP 13182172.0 dated Feb. 11, 2016 (7 pages).

* cited by examiner

ROBOT, ROBOT CONTROL DEVICE, AND ROBOT SYSTEM

BACKGROUND

1. Technical Field

The present invention relates to a robot, a robot control device, and a robot system.

2. Related Art

JP-A-2011-136395 discloses a robot including a six-axis sensor that is installed to a sixth link at a front end portion, that is, the front-most end side of the robot. The six-axis sensor detects accelerations in the directions of an X-axis, a Y-axis, and a Z-axis perpendicular to one another and accelerations about the X-axis, the Y-axis, and the Z-axis. Based on the detection results of the six-axis sensor, a vibration component of the angular velocity of each link about a desired axis is obtained, and control for suppressing the vibration is performed. The vibration component of the angular velocity of the link is referred to as "torsional angular velocity", "vibration angular velocity", or the like.

In the robot disclosed in JP-A-2011-136395, since the posture of the six-axis sensor is changed due to the motion of the robot, it is necessary to perform coordinate axis transformation or the like, called Jacobi's transformation, to obtain the vibration component of the angular velocity of each link from the detection results of the six-axis sensor. Furthermore, it is necessary to make a calculation according to the rotation angle of a motor changing every moment.

Because of this, complex and massive arithmetic processing is needed, and a control device having a high-performance and expensive CPU (Central Processing Unit) or the like is needed, leading to a problem of increased cost.

Moreover, since complex and massive arithmetic processing is needed, an arithmetic error is likely to occur and thus the arithmetic error causes a problem of failing to sufficiently suppress vibration.

SUMMARY

An advantage of some aspects of the invention is to provide a robot that can easily and reliably suppress vibration, a robot control device, and a robot system.

Such an advantage can be achieved by the following aspects of the invention.

An aspect of the invention is directed to a robot including: a base; a first arm rotatably coupled to the base about a first axis of rotation; a second arm rotatably coupled to the first arm about a second axis of rotation, the second axis of rotation being an axis perpendicular to the first axis of rotation or being an axis parallel to an axis perpendicular to the first axis of rotation; a third arm rotatably coupled to the second arm about a third axis of rotation, the third axis of rotation being an axis parallel to the second axis of rotation; a first angular velocity sensor installed to the first arm and having an angular velocity detection axis parallel to the first axis of rotation; and a second angular velocity sensor installed to the third arm and having an angular velocity detection axis parallel to the third axis of rotation.

Due to this, vibration can be easily and reliably suppressed.

That is, first, the first angular velocity sensor can detect the angular velocity of the first arm. Moreover, since the third axis of rotation is parallel to the second axis of rotation, the second angular velocity sensor can detect the angular velocity of the third arm including the rotation of the second arm. Then, based on these detection results, vibration can be suppressed.

Even when the posture of the robot is changed, the angular velocity detection axis of the first angular velocity sensor is constant. Because of this, a correction due to the orientation of the first angular velocity sensor does not need to be performed on the angular velocity of the first arm detected by the first angular velocity sensor.

The third axis of rotation and the second axis of rotation are perpendicular to the first axis of rotation or parallel to an axis perpendicular to the first axis of rotation. Therefore, even when the posture of the robot is changed, for example, even when the first arm rotates or the second arm rotates, the angular velocity detection axis of the second angular velocity sensor is constant. Because of this, a correction due to the orientation of the second angular velocity sensor does not need to be performed on the angular velocity of the third arm detected by the second angular velocity sensor.

Due to this, a complex and massive arithmetic operation is not needed, whereby an arithmetic error is unlikely to occur, vibration can be reliably suppressed, and a response speed in the control of the robot can be increased.

The second angular velocity sensor does not detect the angular velocity of the second arm, but rather detects the angular velocity of the third arm including the rotation of the second arm, and therefore vibration can be suppressed more reliably.

Compared to the case where an angular velocity sensor is also installed to the second arm, the number of angular velocity sensors can be reduced, the cost can be reduced, and the configuration can be simplified.

In the robot according to the aspect of the invention, it is preferable that the robot further includes: a first angular velocity sensor unit having a first housing, the first angular velocity sensor, and a circuit section, the first angular velocity sensor and the circuit section being disposed in the first housing, the circuit section AD-converting a signal output from the first angular velocity sensor and transmitting the signal; and a second angular velocity sensor unit having a second housing, the second angular velocity sensor, and a circuit section, the second angular velocity sensor and the circuit section being disposed in the second housing, the circuit section AD-converting a signal output from the second angular velocity sensor and transmitting the signal, that the first angular velocity sensor unit is installed to the first arm, and that the second angular velocity sensor unit is installed to the third arm.

Due to this, compared to the case where the circuit section is separately disposed, the configuration can be simplified.

In the robot according to the aspect of the invention, it is preferable that the first housing and the second housing each have an outer shape of a rectangular parallelepiped, that the angular velocity detection axis of the first angular velocity sensor coincides with a first line normal to a largest surface of the rectangular parallelepiped of the first housing, and that the angular velocity detection axis of the second angular velocity sensor coincides with a second line normal to a largest surface of the rectangular parallelepiped of the second housing.

Due to this, directions of the angular velocity detection axis of the first angular velocity sensor and the angular velocity detection axis of the second angular velocity sensor can be easily and reliably recognized, and thus the first angular velocity sensor and the second angular velocity sensor can easily take a proper posture.

In the robot according to the aspect of the invention, it is preferable that the first housing has a mount portion mounted to the first arm at a corner of the first housing, and that the second housing has a mount portion mounted to the third arm at a corner of the second housing.

Due to this, the first angular velocity sensor unit can be reliably mounted to the first arm, and the second angular velocity sensor unit can be reliably mounted to the third arm.

In the robot according to the aspect of the invention, it is preferable that a first fixing member having conductivity and fixing the mount portion of the first housing to the first arm is provided and the circuit section of the first angular velocity sensor unit is grounded to the first arm through the fixing member, and that a second fixing member having conductivity and fixing the mount portion of the second housing to the third arm is provided and the circuit section of the second angular velocity sensor unit is grounded to the third arm through the fixing member.

Due to this, the number of components can be reduced, and the configuration can be simplified.

In the robot according to the aspect of the invention, it is preferable that the first arm has a case and an arm-side mount portion formed integrally with the case, and that the first angular velocity sensor unit is directly mounted to the arm-side mount portion.

Due to this, the first angular velocity sensor unit can reliably rotate integrally with the first arm.

In the robot according to the aspect of the invention, it is preferable that the third arm has a case and an arm-side mount portion formed integrally with the case, and that the second angular velocity sensor unit is directly mounted to the arm-side mount portion.

Due to this, the second angular velocity sensor unit can reliably rotate integrally with the third arm.

In the robot according to the aspect of the invention, it is preferable to install a cable in the first arm that supplies electric power to the robot, and to arrange the first angular velocity sensor at an end portion of the first arm on the side opposite to the cable.

Due to this, the first angular velocity sensor can be prevented from being affected by noise generated from the cable, and the first angular velocity sensor-side circuit or wiring can be prevented from short-circuiting by the cable.

In the robot according to the aspect of the invention, it is preferable to install a cable in the third arm that supplies electric power to the robot, and to arrange the second angular velocity sensor at an end portion of the third arm on the side opposite to the cable.

Due to this, the second angular velocity sensor can be prevented from being affected by noise generated from the cable, and the second angular velocity sensor-side circuit or wiring can be prevented from short-circuiting by the cable.

In the robot according to the aspect of the invention, it is preferable that the robot further includes: a fourth arm rotatably coupled to the third arm about a fourth axis of rotation, the fourth axis of rotation being an axis perpendicular to the third axis of rotation or being an axis parallel to an axis perpendicular to the third axis of rotation; a fifth arm rotatably coupled to the fourth arm about a fifth axis of rotation, the fifth axis of rotation being an axis perpendicular to the fourth axis of rotation or being an axis parallel to an axis perpendicular to the fourth axis of rotation; and a sixth arm rotatably coupled to the fifth arm about a sixth axis of rotation, the sixth axis of rotation being an axis perpendicular to the fifth axis of rotation or being an axis parallel to an axis perpendicular to the fifth axis of rotation.

Due to this, more complex motion can be easily performed.

In the robot according to the aspect of the invention, it is preferable that the first axis of rotation coincides with a line normal to an installation surface of the base.

Due to this, the control of the robot can be easily performed.

Another aspect of the invention is directed to a robot control device controlling operation of a robot including a base, a first arm rotatably coupled to the base about a first axis of rotation, a second arm rotatably coupled to the first arm about a second axis of rotation, the second axis of rotation being an axis perpendicular to the first axis of rotation or being an axis parallel to an axis perpendicular to the first axis of rotation, and a third arm rotatably coupled to the second arm about a third axis of rotation, the third axis of rotation being an axis parallel to the second axis of rotation, the robot control device including: a reception section receiving a first signal and a second signal, the first signal being output from a first angular velocity sensor, the first angular velocity sensor being installed to the first arm and having an angular velocity detection axis parallel to the first axis of rotation, the second signal being output from a second angular velocity sensor, the second angular velocity sensor being installed to the third arm and having an angular velocity detection axis parallel to the third axis of rotation; an arithmetic section obtaining, based on the first signal and the second signal received by the reception section, a vibration component of angular velocity of the first arm and a vibration component of angular velocity of the third arm; and a control section controlling the operation of the robot based on the vibration component of the angular velocity of the first arm and the vibration component of the angular velocity of the third arm obtained by the arithmetic section.

Due to this, vibration can be easily and reliably suppressed.

That is, first, the arithmetic section can obtain, based on the angular velocity of the first arm detected by the first angular velocity sensor, a vibration component of the angular velocity of the first arm. Since the third axis of rotation is parallel to the second axis of rotation, the arithmetic section can obtain, based on the angular velocity of the third arm including the rotation of the second arm detected by the second angular velocity sensor, a vibration component of the angular velocity of the third arm including a vibration component of the angular velocity of the second arm. Then, based on the vibration component of the angular velocity of the first arm and the vibration component of the angular velocity of the third arm, vibration can be suppressed.

Even when the posture of the robot is changed, the angular velocity detection axis of the first angular velocity sensor is constant. Because of this, a correction due to the orientation of the first angular velocity sensor does not need to be performed on the angular velocity of the first arm detected by the first angular velocity sensor.

The third axis of rotation and the second axis of rotation are perpendicular to the first axis of rotation or parallel to an axis perpendicular to the first axis of rotation. Therefore, even when the posture of the robot is changed, for example, even when the first arm rotates or the second arm rotates, the angular velocity detection axis of the second angular velocity sensor is constant. Because of this, a correction due to the orientation of the second angular velocity sensor does not need to be performed on the angular velocity of the third arm detected by the second angular velocity sensor.

Due to this, a complex and massive arithmetic operation is not needed, whereby an arithmetic error is unlikely to occur, vibration can be reliably suppressed, and a response speed in the control of the robot can be increased.

The arithmetic section obtains, based not on the vibration component of the angular velocity only of the second arm but on the angular velocity of the third arm including the rotation of the second arm detected by the second angular velocity sensor, the vibration component of the angular velocity of the third arm including the vibration component of the angular velocity of the second arm. Therefore, vibration can be suppressed more reliably.

Still another aspect of the invention is directed to a robot system including: the robot according to the aspect of the invention; and a robot control device controlling operation of the robot.

Due to this, vibration can be easily and reliably suppressed.

That is, first, the first angular velocity sensor can detect the angular velocity of the first arm. Since the third axis of rotation is parallel to the second axis of rotation, the second angular velocity sensor can detect the angular velocity of the third arm including the rotation of the second arm. Then, based on these detection results, vibration can be suppressed.

Even when the posture of the robot is changed, the angular velocity detection axis of the first angular velocity sensor is constant. Because of this, a correction due to the orientation of the first angular velocity sensor does not need to be performed on the angular velocity of the first arm detected by the first angular velocity sensor.

The third axis of rotation and the second axis of rotation are perpendicular to the first axis of rotation or parallel to an axis perpendicular to the first axis of rotation. Therefore, even when the posture of the robot is changed, for example, even when the first arm rotates or the second arm rotates, the angular velocity detection axis of the second angular velocity sensor is constant. Because of this, a correction due to the orientation of the second angular velocity sensor does not need to be performed on the angular velocity of the third arm detected by the second angular velocity sensor.

Due to this, a complex and massive arithmetic operation is not needed, whereby an arithmetic error is unlikely to occur, vibration can be reliably suppressed, and a response speed in the control of the robot can be increased.

Since the second angular velocity sensor does not detect the angular velocity of the second arm, but rather detects the angular velocity of the third arm including the rotation of the second arm, vibration can be suppressed more reliably.

Compared to the case where an angular velocity sensor is also installed to the second arm, the number of angular velocity sensors can be reduced, the cost can be reduced, and the configuration can be simplified.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a robot, a robot control device, and a robot system of the invention will be described in detail based on a preferred embodiment shown in the accompanying drawings.

Figure 1:
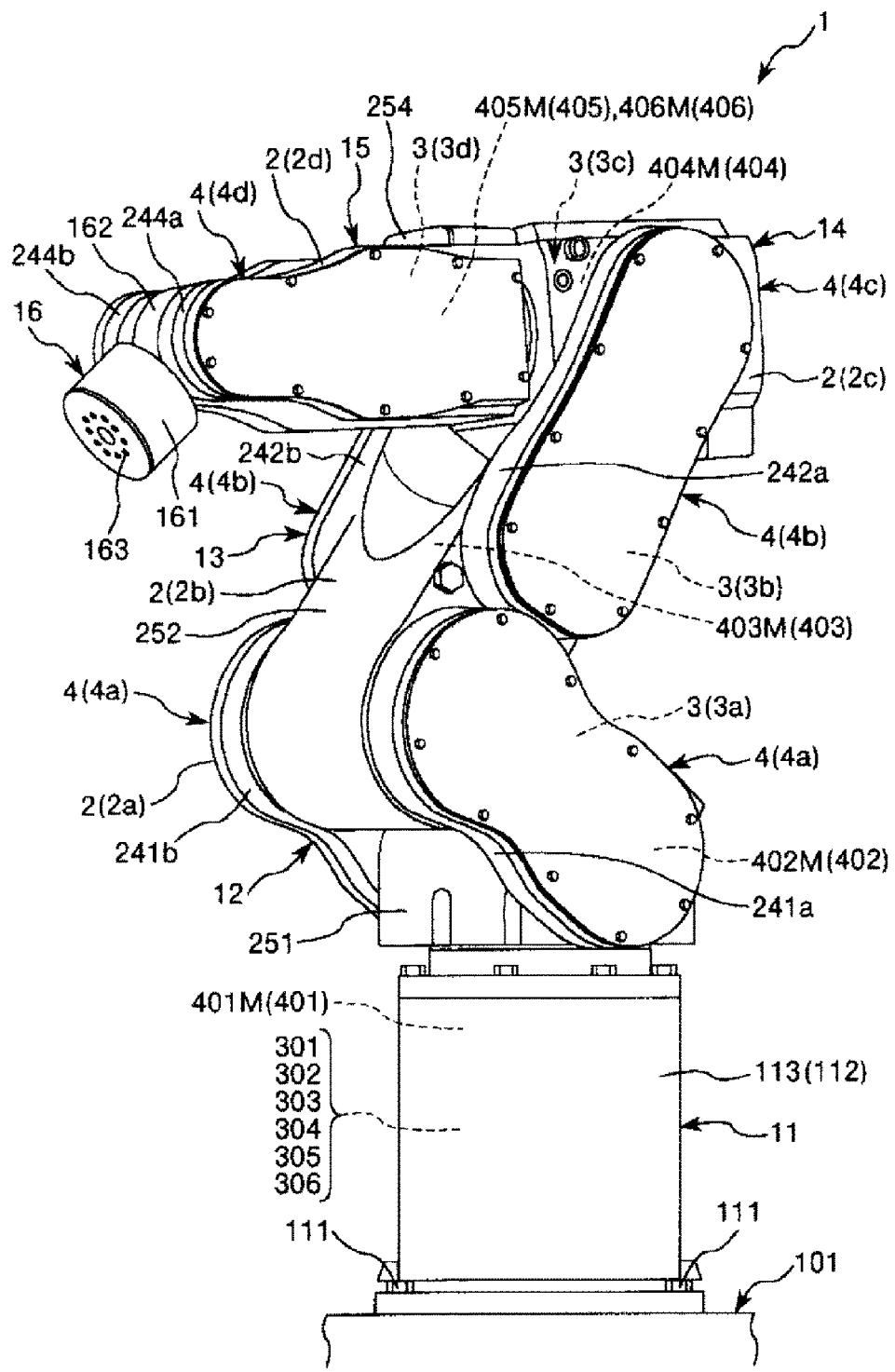
FIG. 1 is a perspective view of an embodiment of a robot of the invention as viewed from the front side.
Figure 2:
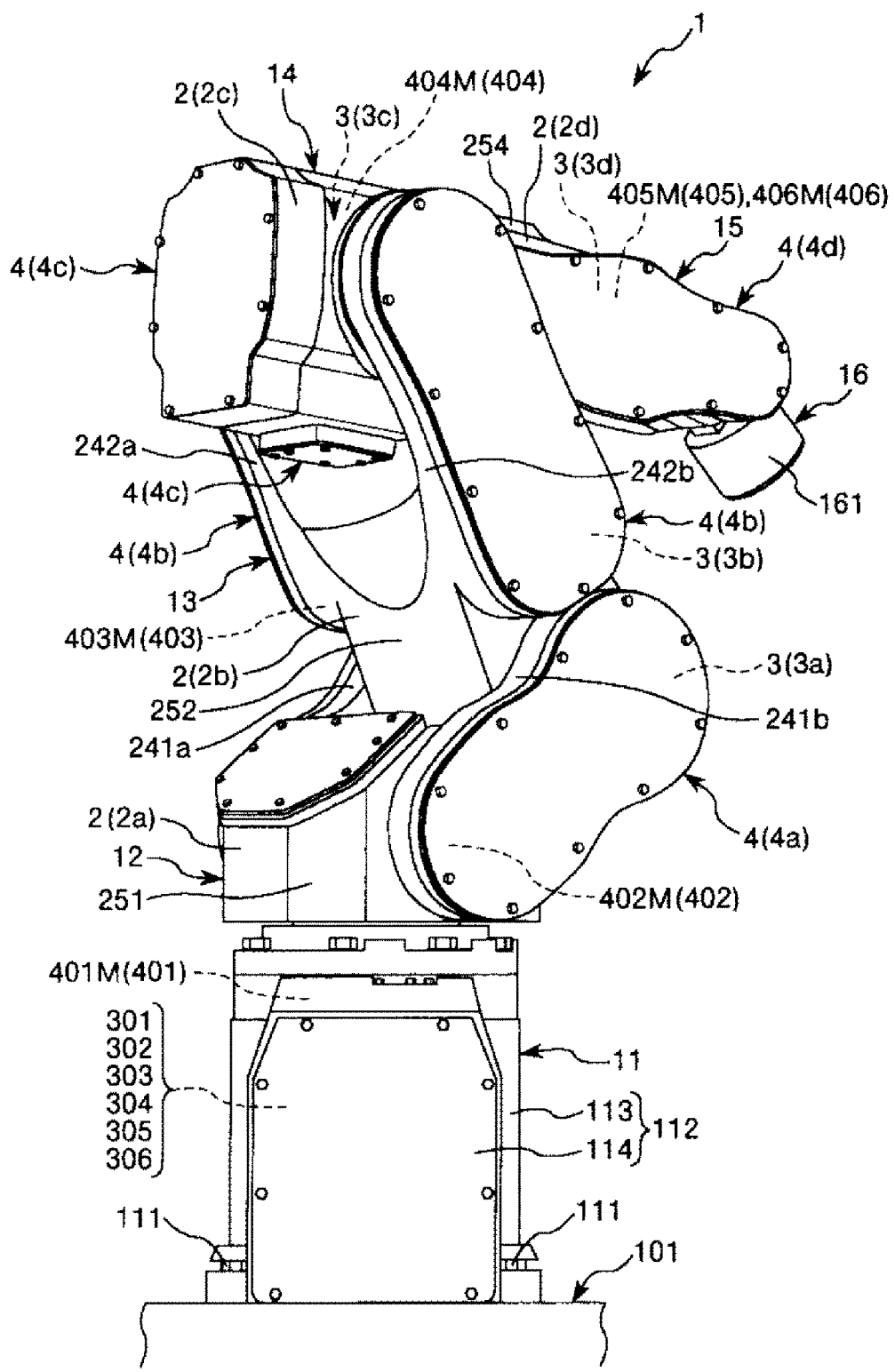
FIG. 2 is a perspective view of the robot shown in FIG. 1 as viewed from the back side.
Figure 3:
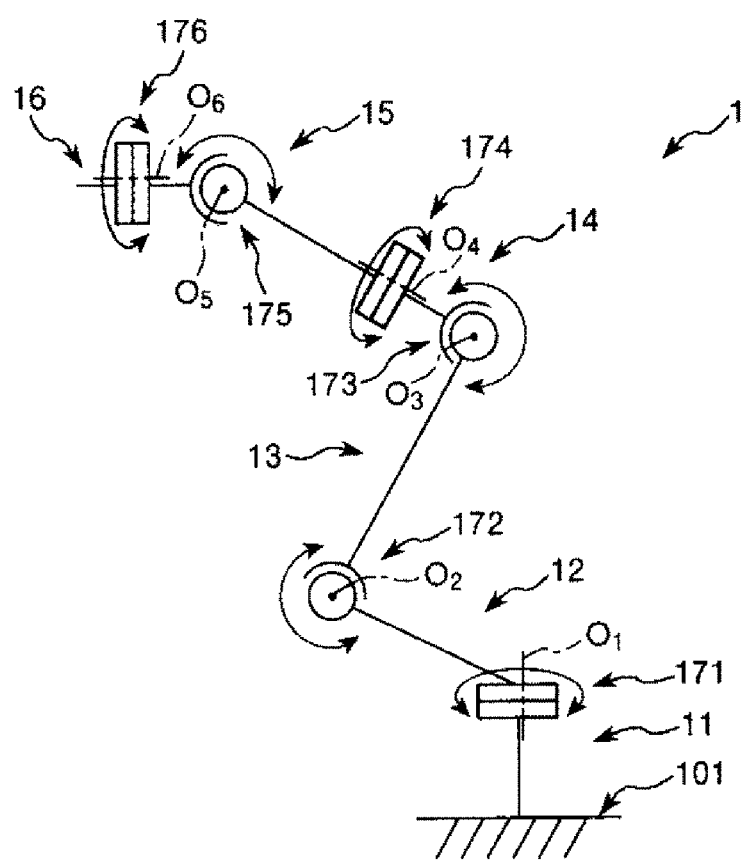
FIG. 3 is a schematic view of the robot shown in FIG. 1.
Figure 4:
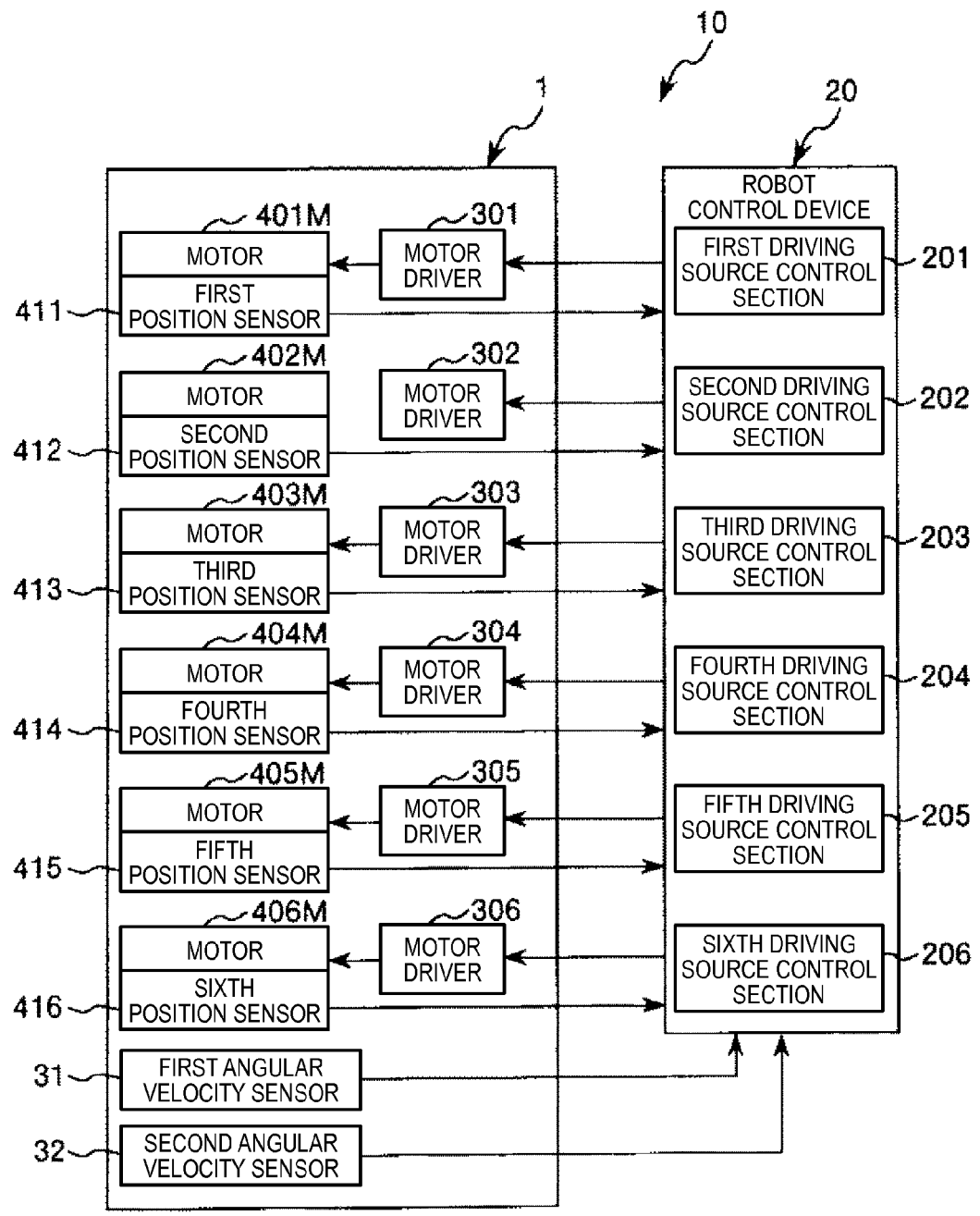
FIG. 4 is a block diagram of a main portion of a robot system having the robot shown in FIG. 1.
Figure 5:
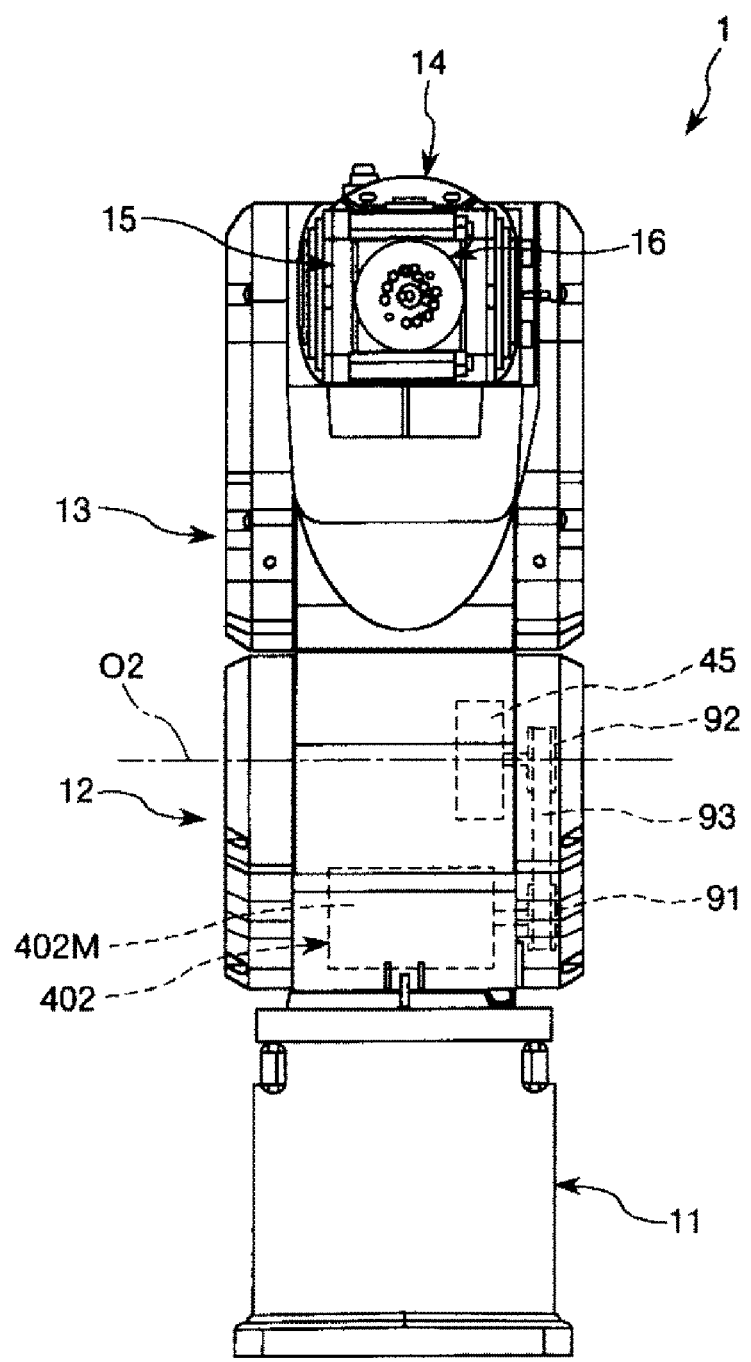
FIG. 5 is an elevation view of the robot shown in FIG. 1.
Figure 6:
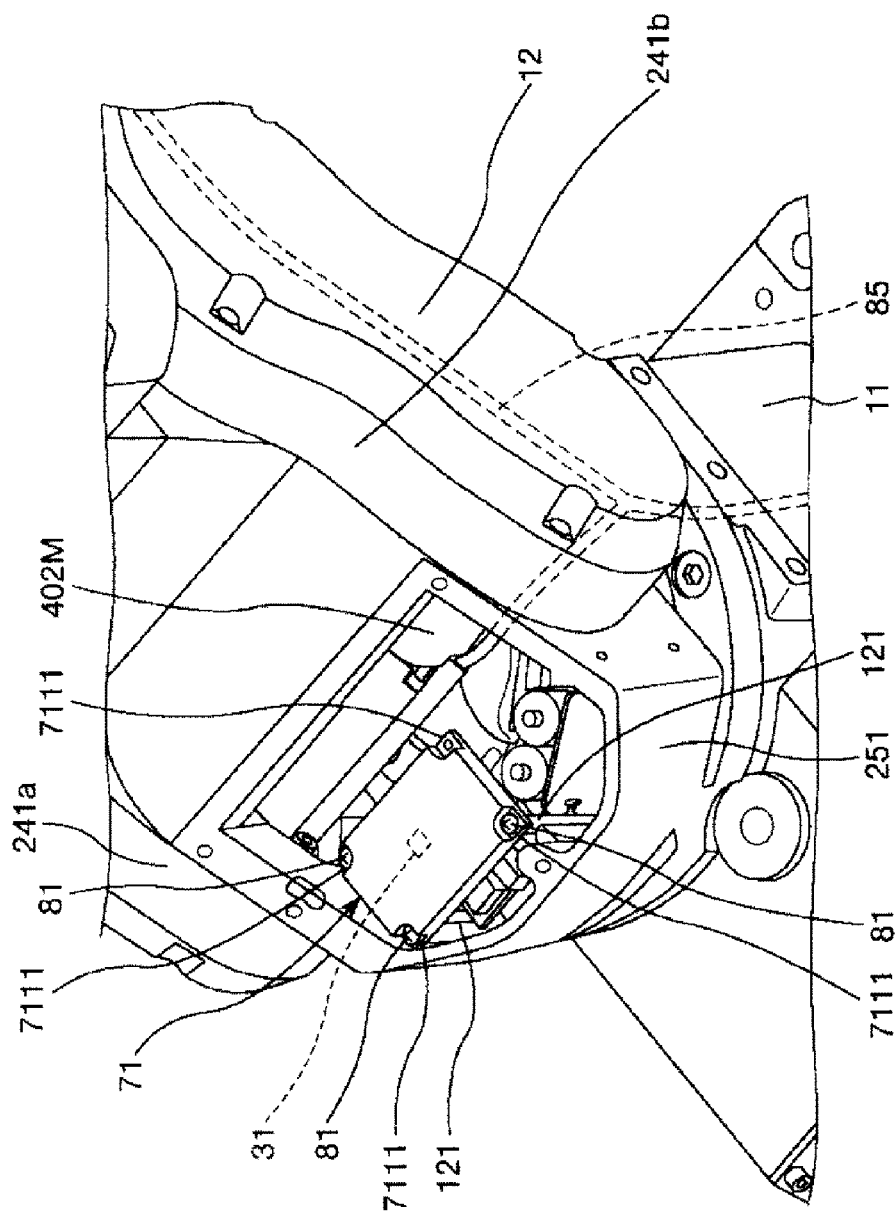
FIG. 6 shows the vicinity of a first angular velocity sensor in a first arm of the robot shown in FIG. 1.
Figure 7:
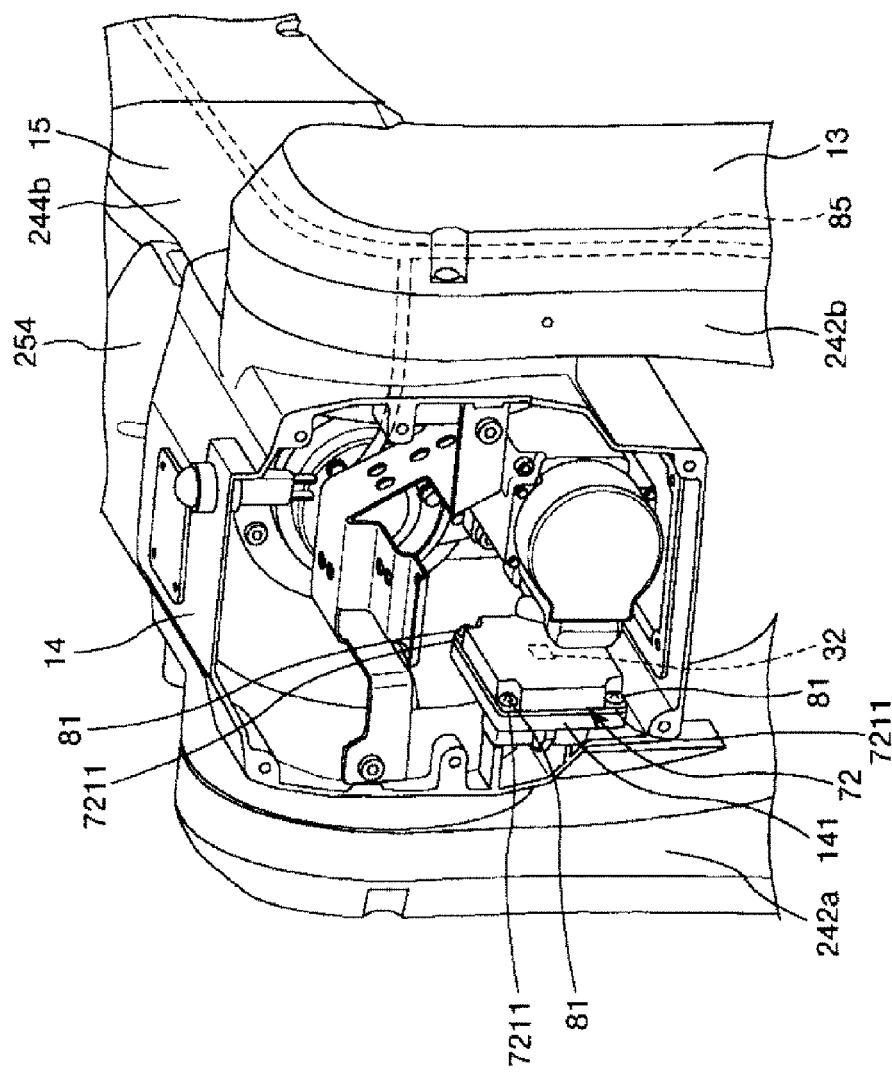
FIG. 7 shows the vicinity of a second angular velocity sensor in a third arm of the robot shown in FIG. 1.
Figure 8:
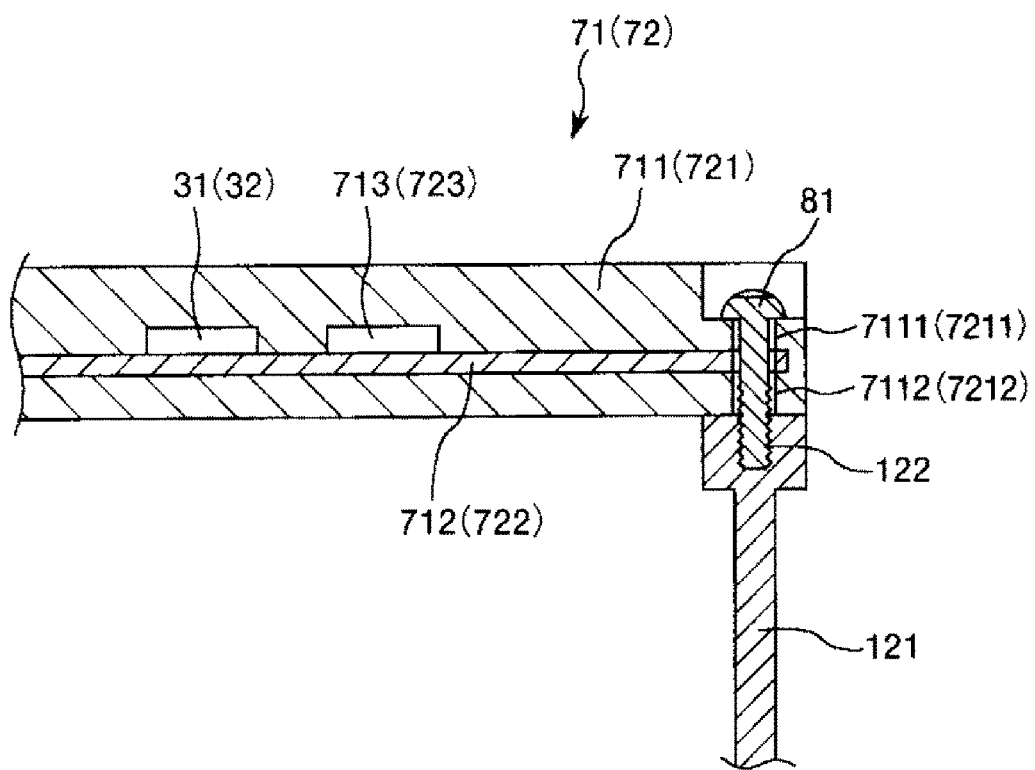
FIG. 8 is a cross-sectional view of a first angular velocity sensor unit of the robot shown in FIG. 1.

FIG. 1 is a perspective view of the embodiment of the robot of the invention as viewed from the front side. FIG. 2 is a perspective view of the robot shown in FIG. 1 as viewed from the back side. FIG. 3 is a schematic view of the robot shown in FIG. 1. FIG. 4 is a block diagram of a main portion of the robot system having the robot shown in FIG. 1. FIG. 5 is an elevation view of the robot shown in FIG. 1. FIG. 6 shows the vicinity of a first angular velocity sensor in a first arm of the robot shown in FIG. 1. FIG. 7 shows the vicinity of a second angular velocity sensor in a third arm of the robot shown in FIG. 1. FIG. 8 is a cross-sectional view of a first angular velocity sensor unit of the robot shown in FIG. 1. FIGS. 9 to 13 are block diagrams each showing a main portion of the robot shown in FIG. 1.

In the following, the upper side in FIGS. 1 to 3 and 5 to 7 is referred to as "top" or "upper", while the lower side is referred to as "down" or "lower", for convenience of description. Moreover, the side of a base in FIGS. 1 to 3 and 5 to 7 is referred to as "base end", while the opposite side is referred to as "front end". In FIG. 8, a reference numeral and sign of each part of a second angular velocity sensor unit is shown in parentheses, corresponding to that of the first angular velocity sensor unit. Therefore, the illustration of the second angular velocity sensor unit is omitted.

A robot system (industrial robot system) 10 shown in FIGS. 1 to 4 can be used in, for example, the manufacturing process for manufacturing precision instrument or the like such as a wristwatch, and has a robot (industrial robot) 1 and a robot control device (controller) 20 (refer to FIG. 4) that controls operation of the robot 1. The robot 1 and the robot control device 20 are electrically connected. The robot control device 20 can be configured of, for example, a personal computer (PC) or the like incorporating a CPU (Central Processing Unit) therein. The robot control device 20 will be described in detail later.

The robot 1 includes a base 11, four arms (links) 12, 13, 14, and 15, a wrist (link) 16, and six driving sources 401, 402, 403, 404, 405, and 406. The robot 1 is a vertical articulated (six-axis) robot (robot main body) having the base 11, the arms 12, 13, 14, and 15, and the wrist 16 coupled with one another in this order from the base end side toward the front end side. In the vertical articulated robot, the base 11, the arms 12 to 15, and the wrist 16 can be collectively referred to as "arm", and the arm 12, the arm 13, the arm 14, the arm 15, and the wrist 16 can be separately referred to as "first arm", "second arm", "third arm", "fourth arm", and "fifth arm and sixth arm", respectively. In the embodiment, the wrist 16 has the fifth arm and the sixth arm. An end effector or the like can be mounted to the wrist 16.

The arms 12 to 15 and the wrist 16 are displaceably supported by the base 11 independently of each other. The lengths of the arms 12 to 15 and the wrist 16 are not particularly limited. In the configuration shown in the drawing, however, the lengths of the first arm 12, the second arm 13, and the fourth arm 15 are set to be greater than those of the third arm 14 and the wrist 16.

The base 11 and the first arm 12 are coupled to each other via a joint 171. The first arm 12 is rotatable relative to the base 11 about a first axis of rotation O1, which is parallel to the vertical direction, with the first axis of rotation O1 as the center of rotation. The first axis of rotation O1 coincides with a normal line to a top surface of a floor 101 as an installation surface of the base 11. The rotation about the first axis of rotation O1 is made by the driving of the first driving source 401 having a motor 401M. The first driving source 401 is driven by the motor 401M and a cable (not shown). The motor 401M is controlled, via a motor driver 301 electrically connected thereto, by the robot control device 20 (refer to FIG. 4). The first driving source 401 may be configured so as to transmit a driving force from the motor 401M with a speed reducer (not shown) disposed together with the motor 401M, or a speed reducer may be omitted. In the embodiment, however, the first driving source 401 has a speed reducer.

The first arm 12 and the second arm 13 are coupled to each other via a joint 172. The second arm 13 is rotatable relative to the first arm 12 with a second axis of rotation O2, which is parallel to the horizontal direction, as the center of axis. The second axis of rotation O2 is perpendicular to the first axis of rotation O1. The rotation about the second axis of rotation O2 is made by the driving of a second driving source 402 having a motor 402M. The second driving source 402 is driven by the motor 402M and a cable (not shown). The motor 402M is controlled, via a motor driver 302 electrically connected thereto, by the robot control device 20 (refer to FIG. 4). The second driving source 402 may be configured so as to transmit a driving force from the motor 402M with a speed reducer 45 (refer to FIG. 5) disposed together with the motor 402M, or a speed reducer may be omitted. In the embodiment, however, the second driving source 402 has the speed reducer 45. The second axis of rotation O2 may be parallel to an axis perpendicular to the first axis of rotation O1.

The second arm 13 and the third arm 14 are coupled to each other via a joint 173. The third arm 14 can rotate relative to the second arm 13 about a third axis of rotation O3, which is parallel to the horizontal direction, with the axis of rotation O3 as the center of rotation. The third axis of rotation O3 is parallel to the second axis of rotation O2. The rotation about the third axis of rotation O3 is made by the driving of the third driving source 403. The third driving source 403 is driven by a motor 403M and a cable (not shown). The motor 403M is controlled, via a motor driver 303 electrically connected thereto, by the robot control device (refer to FIG. 4). The third driving source 403 may be configured so as to transmit a driving force from the motor 403M with a speed reducer (not shown) disposed together with the motor 403M, or a speed reducer may be omitted. In the embodiment, however, the third driving source 403 has a speed reducer.

The third arm 14 and the fourth arm 15 are coupled to each other via a joint 174. The fourth arm 15 is rotatable relative to the third arm 14 (the base 11) about a fourth axis of rotation O4, which is parallel to the central axis direction of the third arm 14, with the fourth axis of rotation O4 as the center of rotation. The fourth axis of rotation O4 is perpendicular to the third axis of rotation O3. The rotation about the fourth axis of rotation O4 is made by the driving of the fourth driving source 404. The fourth driving source 404 is driven by a motor 404M and a cable (not shown). The motor 404M is controlled, via a motor driver 304 electrically connected thereto, by the robot control device 20 (refer to FIG. 4). The fourth driving source 404 may be configured so as to transmit a driving force from the motor 404M with a speed reducer (not shown) disposed together with the motor 404M, or a speed reducer may be omitted. In the embodiment, however, the fourth driving source 404 has a speed reducer. The fourth axis of rotation O4 may be parallel to an axis perpendicular to the third axis of rotation O3.

The fourth arm 15 and the fifth wrist 16 are coupled to each other via a joint 175. The wrist 16 is rotatable relative to the fourth arm 15 about a fifth axis of rotation O5, which is parallel to the horizontal direction (Y-axis direction), with the fifth axis of rotation O5 as the center of rotation. The fifth axis of rotation O5 is perpendicular to the fourth axis of rotation O4. The rotation about the fifth axis of rotation O5 is made by the driving of the fifth driving source 405. The fifth driving source 405 is driven by a motor 405M and a cable (not shown). The motor 405M is controlled, via a motor driver 305 electrically connected thereto, by the robot control device 20 (refer to FIG. 4). The fifth driving source 405 may be configured so as to transmit a driving force from the motor 405M with a speed reducer (not shown) disposed together with the motor 405M, or a speed reducer may be omitted. In the embodiment, however, the fifth driving source 405 has a speed reducer. Moreover, the wrist 16 is rotatable via a joint 176 also about a sixth axis of rotation O6, which is normal to the fifth axis of rotation O5, with the sixth axis of rotation O6 as the center of rotation. The axis of rotation O6 is perpendicular to the axis of rotation O5. The rotation about the sixth axis of rotation O6 is made by the driving of the sixth driving source 406. The sixth driving source 406 is driven by a motor 406M and a cable (not shown). The motor 406M is controlled, via a motor driver 306 electrically connected thereto, by the robot control device 20 (refer to FIG. 4). The sixth driving source 406 may be configured so as to transmit a driving force from the motor 406M with a speed reducer (not shown) disposed together with the motor 406M, or a speed reducer may be omitted. In the embodiment, however, the sixth driving source 406 has a speed reducer. The fifth axis of rotation O5 may be parallel to an axis perpendicular to the fourth axis of rotation O4. The sixth axis of rotation O6 may be parallel to an axis perpendicular to the fifth axis of rotation O5.

As shown in FIG. 6, a first angular velocity sensor 31, that is, a first angular velocity sensor unit 71 having the first angular velocity sensor 31 is installed to the first arm 12. The first angular velocity sensor 31 detects an angular velocity of the first arm 12 about the first axis of rotation O1.

As shown in FIG. 7, a second angular velocity sensor 32, that is, a second angular velocity sensor unit 72 having the second angular velocity sensor 32 is installed to the third arm 14. The second angular velocity sensor 32 detects an angular velocity of the third arm 14 about the second axis of rotation O2.

The first angular velocity sensor 31 and the second angular velocity sensor 32 are not particularly limited, and for example, a gyro sensor or the like can be used.

In the robot 1, vibrations of the first arm 12, the second arm 13, and the third arm 14 are suppressed, whereby the vibration of the entire robot 1 is suppressed. However, for suppressing the vibrations of the first arm 12, the second arm 13, and the third arm 14, an angular velocity sensor is not installed to all of the first arm 12, the second arm 13, and the third arm 14. As described above, the first angular velocity sensor 31 and the second angular velocity sensor 32 are installed only to the first arm 12 and the third arm 14. Based on the detection results of the first angular velocity sensor 31 and the second angular velocity sensor 32, operations of the driving sources 401 and 402 are controlled. Due to this, compared to the case where an angular velocity sensor is installed to all of the first arm 12, the second arm 13, and the third arm 14, the number of angular velocity sensors can be reduced, the cost can be reduced, and a circuit configuration can be simplified. Moreover, since the second angular velocity sensor 32 does not detects the angular velocity of the second arm 13, but rather detects the angular velocity of the third arm 14 including the rotation of the second arm 13, the vibration can be suppressed more reliably. Moreover, by controlling the operation of the second driving source 402 that rotates the second arm 13 located on the base end side of the third arm 14, an effect of suppressing the vibration of the robot 1 can be enhanced.

A first position sensor 411, a second position sensor 412, a third position sensor 413, a fourth position sensor 414, a fifth position sensor 415, and a sixth position sensor 416 are disposed in the respective motors or speed reducers of the driving sources 401 to 406. These position sensors are not particularly limited, and for example, an encoder, a rotary encoder, a resolver, a potentiometer, or the like can be used. These position sensors 411 to 416 detect the rotation angles of the shafts of the motors or speed reducers of the driving sources 401 to 406, respectively. The motors of the driving sources 401 to 406 are not particularly limited, and for example, a servomotor such as an AC servomotor or a DC servomotor is preferably used. The cables may be inserted through the robot 1.

As shown in FIG. 4, the robot 1 is electrically connected with the robot control device 20. That is, the driving sources 401 to 406, the position sensors 411 to 416, and the angular velocity sensors 31 and 32 are electrically connected with the robot control device 20.

The robot control device 20 can operate the arms 12 to 15 and the wrist 16 independently of each other. That is, the robot control device 20 can control the driving sources 401 to 406 independently of each other via the motor drivers 301 to 306. In this case, the robot control device 20 performs detection with the position sensors 411 to 416, the first angular velocity sensor 31, and the second angular velocity sensor 32, and controls, based on the detection results, the driving of the driving sources 401 to 406, for example, controls an angular velocity, a rotation angle, or the like. This control program is previously stored in a recording medium incorporated in the robot control device 20.

As shown in FIGS. 1 and 2, when the robot 1 is a vertical articulated robot, the base 11 is located at the lowest portion of the vertical articulated robot and is fixed to the floor 101 as an installation space. This fixing method is not particularly limited. For example, in the embodiment shown in FIGS. 1 and 2, a method of fixing with a plurality of bolts 111 is used. As a fixing place of the base 11 in an installation space, the wall or ceiling of the installation space can be used, in addition to the floor.

The base 11 has a hollow base main body (housing) 112. The base main body 112 can be separated into a cylindrical portion 113 having a cylindrical shape and a box-like portion 114 formed integrally at the periphery of the cylindrical portion 113 and having a box-like shape. In the base main body 112, the motor 401M or the motor drivers 301 to 306, for example, are accommodated.

Each of the arms 12 to 15 has a hollow arm main body (case) 2, a driving mechanism 3, and sealers 4. In the following, for convenience of description, the arm main body 2, the driving mechanism 3, and the sealer 4 included in the first arm 12 are also respectively referred to as "arm main body 2a", "driving mechanism 3a", and "sealer 4a"; the arm main body 2, the driving mechanism 3, and the sealer 4 included in the second arm 13 are also respectively referred to as "arm main body 2b", "driving mechanism 3b", and "sealer 4b"; the arm main body 2, the driving mechanism 3, and the sealer 4 included in the third arm 14 are also respectively referred to as "arm main body 2c", "driving mechanism 3c", and "sealer 4c"; and the arm main body 2, the driving mechanism 3, and the sealer 4 included in the fourth arm 15 are also respectively referred to as "arm main body 2d", "driving mechanism 3d", and "sealer 4d".

Each of the joints 171 to 176 has a rotation support mechanism (not shown). This rotation support mechanism is a mechanism for rotatably supporting one of two arms coupled to each other relative to the other, a mechanism for rotatably supporting one of the base 11 and the first arm 12 coupled to each other relative to the other, or a mechanism for rotatably supporting one of the fourth arm 15 and the fifth wrist 16 coupled to each other relative to the other. When the fourth arm 15 and the wrist 16 coupled to each other are taken as an example, the rotation support mechanism can rotate the wrist 16 relative to the fourth arm 15. Each of the rotation support mechanisms has a speed reducer (not shown) that reduces the rotational speed of the corresponding motor at a predetermined reduction ratio and transmits the driving force to the corresponding arm, or a wrist main body 161 and a support ring 162 of the wrist 16. In the embodiment as described above, the driving source includes this speed reducer and the motor.

The first arm 12 is coupled, in an inclined posture to the horizontal direction, to an upper end portion (front end portion) of the base 11. In the first arm 12, the driving mechanism 3a has the motor 402M, which is accommodated in the arm main body 2a. The interior of the arm main body 2a is airtightly sealed by the sealers 4a. The arm main body 2a has a pair of tongue portions 241a and 241b on the front end side and a root portion 251 on the base end side. The tongue portion 241a and the tongue portion 241b are spaced apart from each other and face each other. Moreover, the tongue portions 241a and 241b are inclined to the root portion 251, whereby the first arm 12 is inclined to the horizontal direction. A base end portion of the second arm 13 is arranged between the tongue portion 241a and the tongue portion 241b.

The installation position of the first angular velocity sensor 31 in the first arm 12 is not particularly limited. In the embodiment as shown in FIG. 6, the first angular velocity sensor 31, that is, the first angular velocity sensor unit 71 is installed inside the root portion 251 of the arm main body 2a of the first arm 12 at an end portion thereof on the side opposite to a cable 85. The cable 85 is a cable that supplies electric power to the motors 401M to 406M of the robot 1. Due to this, the first angular velocity sensor 31 can be prevented from being affected by noise generated from the cable 85. Moreover, a circuit section 713 (described later), a wiring, and the first angular velocity sensor 31 of the first angular velocity sensor unit 71 can be prevented from short-circuiting by the cable 85.

In regard to the driving mechanism 3 and the speed reducer, the driving mechanism 3 that is disposed in the arm main body 2a of the first arm 12 and rotates the second arm 13 will be representatively described.

As shown in FIG. 5, the driving mechanism 3 has a first pulley 91 coupled to the shaft of the motor 402M, a second pulley 92 arranged spaced apart from the first pulley 91, and a belt (timing belt) 93 looped around the first pulley 91 and the second pulley 92. The second pulley 92 and a shaft of the second arm 13 are coupled with the speed reducer 45.

The speed reducer 45 is not particularly limited, and examples thereof include, for example, a speed reducer configured of a plurality of gears and a speed reducer called a Harmonic Drive ("Harmonic Drive" is a registered trademark).

The main causes of the vibrations of the arms 12 to 15 and the wrist 16 of the robot 1 include, for example, the torsion or deformation of the speed reducer 45, the expansion and contraction of the belt 93, the deformation of the arms 12 to 15 and the wrist 16, and the like.

The second arm 13 is coupled to a front end portion of the first arm 12. In the second arm 13, the driving mechanism 3b has the motor 403M, which is accommodated in the arm main body 2b. The interior of the arm main body 2a is airtightly sealed by the sealers 4b. The arm main body 2b has a pair of tongue portions 242a and 242b on the front end side and a root portion 252 on the base end side. The tongue portion 242a and the tongue portion 242b are spaced apart from each other and face each other. A base end portion of the third arm 14 is arranged between the tongue portion 242a and the tongue portion 242b.

The third arm 14 is coupled to a front end portion of the second arm 13. In the third arm 14, the driving mechanism 3c has the motor 404M, which is accommodated in the arm main body 2c. The interior of the arm main body 2c is airtightly sealed by the sealers 4c. The arm main body 2c is configured of a member corresponding to the root portion 251 of the arm main body 2a or the root portion 252 of the arm main body 2b.

The installation position of the second angular velocity sensor 32 in the third arm 14 is not particularly limited. In the embodiment as shown in FIG. 7, the second angular velocity sensor 32, that is, the second angular velocity sensor unit 72 is installed inside the arm main body 2c of the third arm 14 at an end portion thereof on the side opposite to the cable 85. Due to this, the second angular velocity sensor 32 can be prevented from being affected by noise generated from the cable 85. Moreover, a circuit section 723, a wiring, and the second angular velocity sensor 32 of the second angular velocity sensor unit 72 can be prevented from short-circuiting by the cable 85.

The fourth arm 15 is coupled to a front end portion of the third arm 14 in parallel with the central axis direction of the third arm 14. In the arm 15, the driving mechanism 3d has the motors 405M and 406M, which are accommodated in the arm main body 2d. The interior of the arm main body 2d is airtightly sealed by the sealers 4d. The arm main body 2d has a pair of tongue portions 244a and 244b on the front end side and a root portion 254 on the base end side. The tongue portion 244a and the tongue portion 244b are spaced apart from each other and face each other. The support ring 162 of the wrist 16 is arranged between the tongue portion 244a and the tongue portion 244b.

The wrist 16 is coupled to a front end portion (end portion on the side opposite to the base 11) of the fourth arm 15. A manipulator (not shown) that grips, for example, precision instrument such as a wristwatch is detachably attached to the wrist 16 as a functional section (end effector) at its front end portion (end portion on the side opposite to the fourth arm 15). The manipulator is not particularly limited, and examples thereof include, for example, a manipulator configured of a plurality of finger portions (fingers). The robot 1 can control operations of the arms 12 to 15, the wrist 16, and the like, while gripping precision instrument with the manipulator, to thereby convey the precision instrument.

The wrist 16 has the wrist main body (the sixth arm) 161 having a cylindrical shape and the support ring (the fifth arm) 162 having a ring-like shape. The support ring 162 is configured separately from the wrist main body 161 and disposed at a base end portion of the wrist main body 161.

A front end surface 163 of the wrist main body 161 is a flat surface and serves as an attachment surface to which the manipulator is attached. The wrist main body 161 is coupled to the driving mechanism 3d of the fourth arm 15 via the joint 176 and rotates about the axis of rotation O6 by the driving of the motor 406M of the driving mechanism 3d.

The support ring 162 is coupled to the driving mechanism 3d of the fourth arm 15 via the joint 175 and rotates about the axis of rotation O5 together with the wrist main body 161 by the driving of the motor 405M of the driving mechanism 3d.

The constituent material of the arm main body 2 is not particularly limited, and for example, various metal materials can be used. Among these, aluminum or an aluminum alloy is particularly preferable. When the arm main body 2 is a casting that is molded using a die, the use of aluminum or an aluminum alloy for the constituent material of the arm main body 2 can facilitate die molding.

The constituent materials of the base main body 112 of the base 11, and the wrist main body 161 and the support ring 162 of the wrist 16 are not particularly limited. Examples thereof include, for example, those similar to the constituent material of the arm main body 2. A stainless steel is preferably used for the constituent material of the wrist main body 161 of the wrist 16.

The constituent material of the sealer 4 is not particularly limited, and for example, various resin materials and various metal materials can be used. The use of a resin material as the constituent material of the sealer 4 can achieve a reduction in weight.

Next, the first angular velocity sensor unit 71 and the second angular velocity sensor unit 72 will be described.

As shown in FIG. 8, the first angular velocity sensor unit 71 has a first housing 711, a circuit board 712 disposed in the first housing 711 and having a wiring, and the first angular velocity sensor 31 and the circuit section 713 electrically connected on the circuit board 712. In the embodiment, the first housing 711 is configured of a sealing material. The entirety of the first angular velocity sensor 31, the circuit section 713, and the circuit board 712 are sealed by the sealing material.

In the same manner, the second angular velocity sensor unit 72 has a second housing 721, a circuit board 722 disposed in the second housing 721 and having a wiring, and the second angular velocity sensor 32 and the circuit section 723 electrically connected on the circuit board 722. In the embodiment, the second housing 721 is configured of a sealing material. The entirety of the second angular velocity sensor 32, the circuit section 723, and the circuit board 722 are sealed by the sealing material.

In this manner, the first angular velocity sensor 31 and the circuit section 713, and the second angular velocity sensor 32 and the circuit section 723 are respectively made into packages, whereby the configuration can be simplified.

The first angular velocity sensor unit 71 and the second angular velocity sensor unit 72 are similar to each other. Therefore, the first angular velocity sensor unit 71 will be representatively described below.

First, the circuit section 713 has an AD conversion section and a transmission section. The AD conversion section performs AD conversion on a signal output from the first angular velocity sensor 31, that is, converts an analog signal to a digital signal. The transmission section transmits the converted signal to the robot control device 20.

The outer shape of the first housing 711 is a rectangular parallelepiped.

The first angular velocity sensor 31 has an angular velocity detection axis (hereinafter also referred simply to as "detection axis") and is configured to detect an angular velocity about the detection axis. The detection axis of the first angular velocity sensor 31 coincides with a normal line to the largest surface of the rectangular parallelepiped of the first housing 711. Due to this, directions of the detection axis of the first angular velocity sensor 31 and the detection axis of the second angular velocity sensor 32 can be easily and reliably recognized, and thus the first angular velocity sensor 31 and the second angular velocity sensor 32 can easily take a proper posture. The first angular velocity sensor 31, that is, the first angular velocity sensor unit 71 is installed such that the detection axis of the first angular velocity sensor 31 is parallel to the first axis of rotation O1. The second angular velocity sensor 32, that is, the second angular velocity sensor unit 72 is installed such that the detection axis of the second angular velocity sensor 32 is parallel to the third axis of rotation O3.

As shown in FIGS. 6 and 8, the first housing 711 has, at its four corners, mount portions 7111 mounted to the first arm 12. A hole 7112 into which a male screw (fixing member) 81 is inserted is formed in each of the mount portions 7111.

On the other hand, the first arm 12 is formed integrally with the arm main body 2a and has three arm-side mount portions 121 to which the first angular velocity sensor unit 71 (the first housing 711) is mounted. Each of the arm-side mount portions 121 is configured of a support post formed protrudingly on the arm main body 2a. Each of the arm-side mount portions 121 is arranged at a position corresponding to the mount portion 7111 of the first housing 711. At a front end portion of each of the arm-side mount portions 121, a female screw 122 with which the male screw 81 engages is formed.

The term "integrally" in the phrase "the arm-side mount portion 121 formed integrally with the arm main body 2a" means the case where the arm main body 2a and the arm-side mount portion 121 are not formed by separately forming the respective members and joining them together but formed simultaneously by, for example, die casting or the like. The same applies to the term. "integrally" in the phrase "arm-side mount portion 141 formed integrally with the arm main body 2c" described below.

When the first angular velocity sensor unit 71 is mounted (installed) to the first arm. 12, each of the three male screws 81 is inserted into the hole 7112 of the first housing 711 to engage with the female screw 122 at the front end portion of the arm-side mount portion 121 of the first arm 12. Due to this, each of the three mount portions 7111 of the first housing 711 is fixed to the corresponding arm-side mount portion 121 of the first arm 12 with the male screw 81. That is, the first angular velocity sensor unit 71 is mounted to the arm-side mount portions 121 of the first arm 12. In this case, there is nothing between the arm-side mount portions 121 and the first angular velocity sensor unit 71, that is, the first angular velocity sensor unit 71 is directly mounted to the arm-side mount portions 121. Due to this, the first angular velocity sensor unit 71 can be reliably mounted to the first arm 12. Moreover, the first angular velocity sensor unit 71 can reliably rotate together with the first arm 12.

The term "directly" in the sentence "the first angular velocity sensor unit 71 is directly mounted to the arm-side mount portions 121" means that the first angular velocity sensor unit 71 is not mounted to another intermediate such as a board and the intermediate is mounted to the arm-side mount portions 121. That is, there is nothing between the arm-side mount portions 121 and the first angular velocity sensor unit 71, except for an adhesive or the like. The same applies to the term "directly" in the sentence "the second angular velocity sensor unit 72 is directly mounted to the arm-side mount portion 141" described below.

The male screw 81 has conductivity and is formed of, for example, any metal material. When the male screw 81 is inserted into the hole 7112 of the first housing 711 to engage with the female screw 122 at the front end portion of the arm-side mount portion 121, the male screw 81 is electrically connected to the wiring of the circuit board 712 electrically connected to a grounding terminal of the circuit section 713. Moreover, a front end portion of the male screw 81 is electrically connected to the arm-side mount portion 121. Due to this, the grounding terminal of the circuit section 713 is electrically connected to the arm main body 2a of the first arm 12 via the wiring and the male screw 81, thereby being grounded. Due to this, the number of components required for grounding can be reduced, and thus the configuration can be simplified.

As shown in FIGS. 7 and 8, the second housing 721 has, at its four corners, mount portions 7211 mounted to the third arm 14. A hole 7212 into which a male screw 81 is inserted is formed in each of the mount portions 7211.

As shown in FIG. 7, the third arm 14 has the arm-side mount portion 141 that is formed integrally with the arm main body 2c and to which the second angular velocity sensor unit 72 (the second housing 721) is mounted. The arm-side mount portion 141 has a shape corresponding to the second housing 721. That is, the arm-side mount portion 141 has a plate shape, and the plan-view shape thereof is a quadrilateral (a rectangle in the embodiment). A female screw with which the male screw 81 engages is formed at each corner of the arm-side mount portion 141.

When the second angular velocity sensor unit 72 is mounted to the third arm 14, each of the four male screws 81 is inserted into the hole 7212 of the second housing 721 to engage with the female screw at a front end portion of the arm-side mount portion 141 of the third arm 14. Due to this, the four mount portions 7211 of the second housing 721 are fixed to the arm-side mount portion 141 of the third arm 14 with the male screws 81. That is, the second angular velocity sensor unit 72 is mounted to the arm-side mount portion 141 of the third arm 14. In this case, there is nothing between the arm-side mount portion 141 and the second angular velocity sensor unit 72, that is, the second angular velocity sensor unit 72 is directly mounted to the arm-side mount portion 141. Due to this, the second angular velocity sensor unit 72 can be reliably mounted to the third arm 14. Moreover, the second angular velocity sensor unit 72 can reliably rotate integrally with the third arm 14.

When the male screw 81 is inserted into the hole 7212 of the second housing 721 to engage with the female screw of the arm-side mount portion 141, the male screw 81 is electrically connected to the wiring of the circuit board 722 electrically connected to a grounding terminal of the circuit section 723. Moreover, the front end portion of the male screw 81 is electrically connected to the arm-side mount portion 141. Due to this, the grounding terminal of the circuit section 723 is electrically connected to the arm main body 2c of the third arm 14 via the wiring and the male screw 81, thereby being grounded. Due to this, the number of components required for grounding can be reduced, and thus the configuration can be simplified.

Next, the configuration of the robot control device 20 will be described with reference to FIGS. 4 and 9 to 13.

The robot control device 20 has a reception section, an arithmetic section, and a control section. The reception section receives a first signal output from the first angular velocity sensor 31, a second signal output from the second angular velocity sensor 32, and signals output from the position sensors 411 to 416. The arithmetic section obtains, based on the first signal and the second signal received by the reception section, a vibration component of the angular velocity of the first arm 12 and a vibration component of the angular velocity of the third arm 14. The control section controls the operation of the robot 1 based on the vibration component of the angular velocity of the first arm 12 and the vibration component of the angular velocity of the third arm 14 obtained by the arithmetic section.

Specifically, as shown in FIGS. 4 and 9 to 13, the robot control device 20 has the reception section, a first driving source control section 201 that controls operation of the first driving source 401, a second driving source control section 202 that controls operation of the second driving source 402, a third driving source control section 203 that controls operation of the third driving source 403, a fourth driving source control section 204 that controls operation of the fourth driving source 404, a fifth driving source control section 205 that controls operation of the fifth driving source 405, and a sixth driving source control section 206 that controls operation of the sixth driving source 406.

The arithmetic section is configured of an angular velocity calculation section 561 (described later) and a subtracter 571 of the first driving source control section 201, an angular velocity calculation section 562 (described later) and an adder-subtracter 622 of the second driving source control section 202, and an angular velocity calculation section 563 (described later) of the third driving source control section 203.

Figure 9:
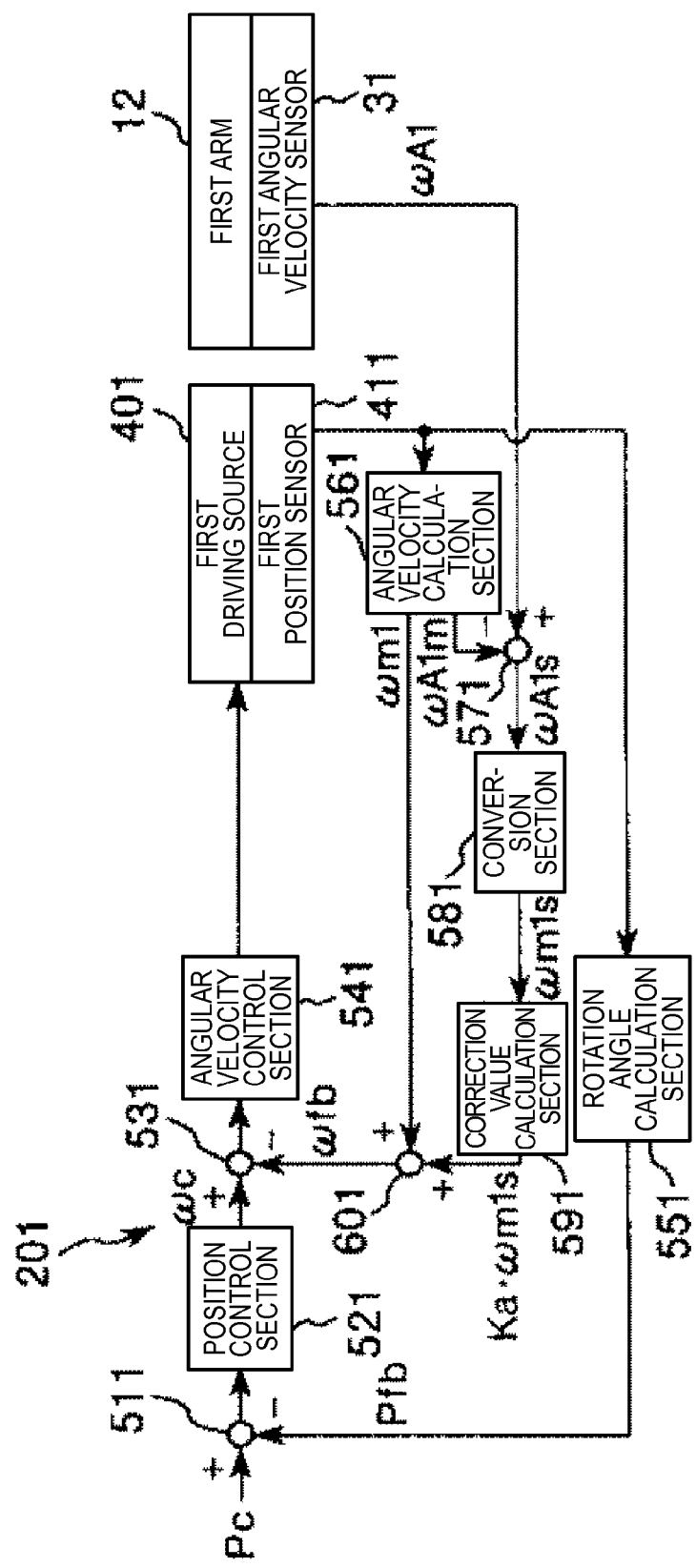
FIG. 9 is a block diagram of a main portion of the robot shown in FIG. 1.

As shown in FIG. 9, the first driving source control section 201 has a subtracter 511, a position control section 521, a subtracter 531, an angular velocity control section 541, a rotation angle calculation section 551, the angular velocity calculation section 561, the subtracter 571, a conversion section 581, a correction value calculation section 591, and an adder 601.

Figure 10:
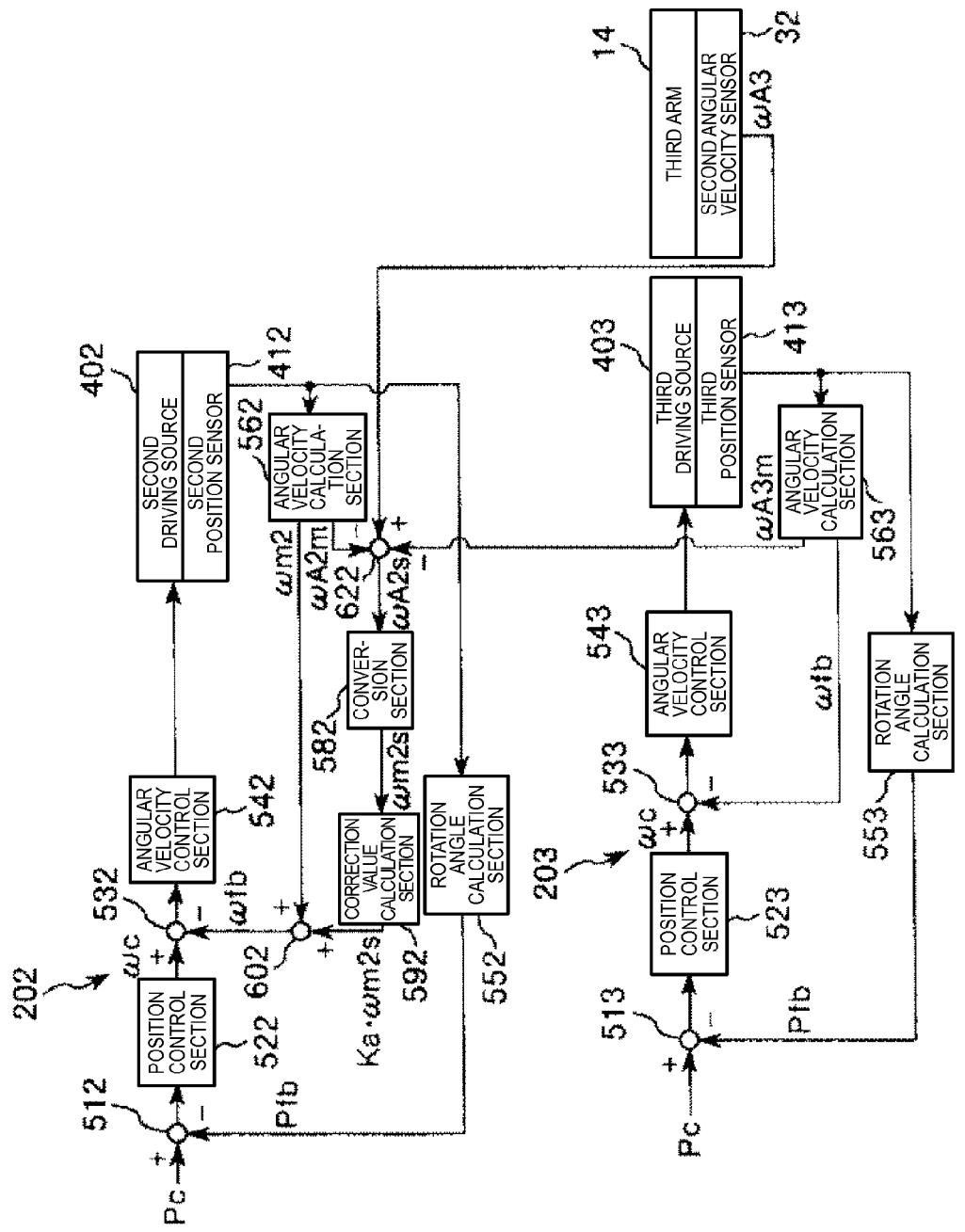
FIG. 10 is a block diagram of a main portion of the robot shown in FIG. 1.

As shown in FIG. 10, the second driving source control section 202 has a subtracter 512, a position control section 522, a subtracter 532, an angular velocity control section 542, a rotation angle calculation section 552, the angular velocity calculation section 562, the adder-subtracter 622, a conversion section 582, a correction value calculation section 592, and an adder 602.

As shown in FIG. 10, the third driving source control section 203 has a subtracter 513, a position control section 523, a subtracter 533, an angular velocity control section 543, a rotation angle calculation section 553, and the angular velocity calculation section 563.

Figure 11:
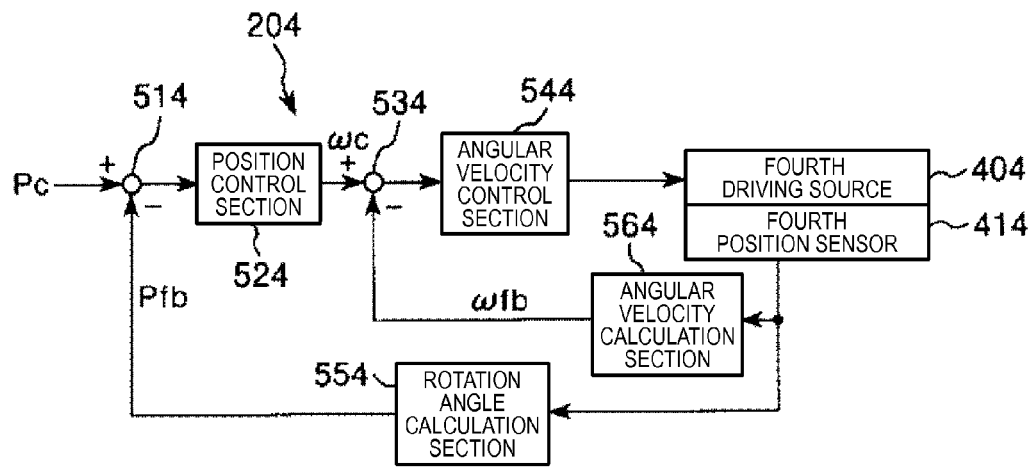
FIG. 11 is a block diagram of a main portion of the robot shown in FIG. 1.

As shown in FIG. 11, the fourth driving source control section 204 has a subtracter 514, a position control section 524, a subtracter 534, an angular velocity control section 544, a rotation angle calculation section 554, and an angular velocity calculation section 564.

Figure 12:
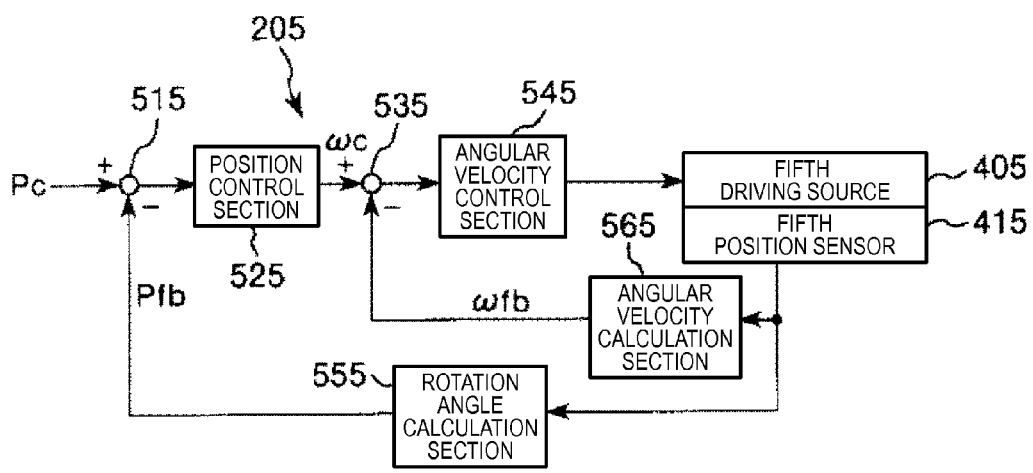
FIG. 12 is a block diagram of a main portion of the robot shown in FIG. 1.

As shown in FIG. 12, the fifth driving source control section 205 has a subtracter 515, a position control section 525, a subtracter 535, an angular velocity control section 545, a rotation angle calculation section 555, and an angular velocity calculation section 565.

Figure 13:
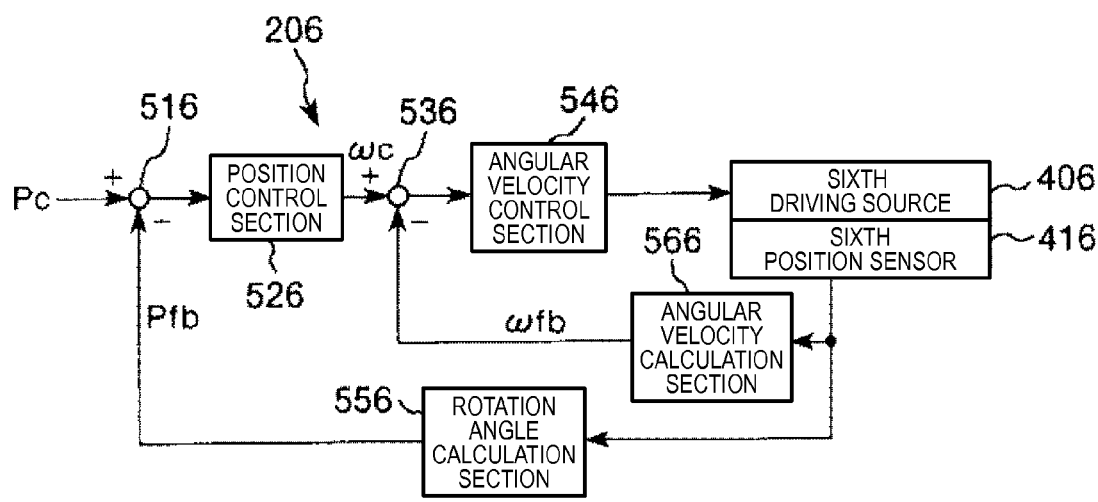
FIG. 13 is a block diagram of a main portion of the robot shown in FIG. 1.

As shown in FIG. 13, the sixth driving source control section 206 has a subtracter 516, a position control section 526, a subtracter 536, an angular velocity control section 546, a rotation angle calculation section 556, and an angular velocity calculation section 566.

The robot control device 20 computes a target position of the wrist 16 based on the contents of processing performed by the robot 1, and generates a trajectory of the wrist 16 to move to the target position. Then, for causing the wrist 16 to move along the generated trajectory, the robot control device 20 measures a rotation angle of each of the driving sources 401 to 406 every predetermined control period, and outputs, as a position command Pc of each of the driving sources 401 to 406, a value computed based on this measured result to the driving source control sections 201 to 206 (refer to FIGS. 9 to 13). In the above and the following, although the sentence "value is input/output" or the like is given, this means that "signal corresponding to the value is input/out".

As shown in FIG. 9, in addition to the position command Pc of the first driving source 401, detection signals are input to the first driving source control section 201 from the first position sensor 411 and the first angular velocity sensor 31. The first driving source control section 201 drives the first driving source 401 by feedback control using the detection signals so that the rotation angle (position feedback value Pfb) of the first driving source calculated from the detection signal of the first position sensor 411 is the position command Pc and an angular velocity feedback value ωfb (described later) is an angular velocity command ωc (described later).

That is, the position command Pc and the position feedback value Pfb (described later) from the rotation angle calculation section 551 are input to the subtracter 511 of the first driving source control section 201. In the rotation angle calculation section 551, the number of pulses input from the first position sensor 411 is counted, and the rotation angle of the first driving source 401 according to the count value is output as the position feedback value Pfb to the subtracter 511. The subtracter 511 outputs a deviation between the position command Pc and the position feedback value Pfb (a value obtained by subtracting the position feedback value Pfb from a target value of the rotation angle of the first driving source 401) to the position control section 521.

The position control section 521 performs predetermined arithmetic processing using the deviation input from the subtracter 511, a proportional gain as a predefined coefficient, and the like to thereby compute the target value of the angular velocity of the first driving source 401 according to the deviation. The position control section 521 outputs, as the angular velocity command ωc, a signal indicating the target value (command value) of the angular velocity of the first driving source 401 to the subtracter 531. In this case, although proportional control (P control) is performed as feedback control in the embodiment, it is not limited thereto.

The angular velocity command ωc and the angular velocity feedback value ωfb (described later) are input to the subtracter 531. The subtracter 531 outputs a deviation between the angular velocity command ωc and the angular velocity feedback value ωfb (a value obtained by subtracting the angular velocity feedback value ωfb from the target value of the angular velocity of the first driving source 401) to the angular velocity control section 541.

The angular velocity control section 541 performs predetermined arithmetic processing including integration using the deviation input from the subtracter 531, a proportional gain and an integral gain as predefined coefficients, and the like to thereby generate a driving signal (driving current) of the first driving source 401 according to the deviation, and supplies the signal to the motor 401M via the motor driver 301. In this case, although PI control is performed as feedback control in the embodiment, it is not limited thereto.

In this manner, the feedback control is performed and the driving current of the first driving source 401 is controlled so that the position feedback value Pfb is as equal as possible to the position command Pc and the angular velocity feedback value ωfb is as equal as possible to the angular velocity command ωc.

Next, the angular velocity feedback value ωfb in the first driving source control section 201 will be described.

In the angular velocity calculation section 561, an angular velocity ωm1 of the first driving source 401 is calculated based on the frequency of a pulse signal input from the first position sensor 411, and the angular velocity ωm1 is output to the adder 601.

In the angular velocity calculation section 561, an angular velocity ωA1m of the first arm 12 about the first axis of rotation O1 is calculated based on the frequency of the pulse signal input from the first position sensor 411, and the angular velocity ωA1m is output to the subtracter 571. The angular velocity ωA1m is a value obtained by dividing the angular velocity ωm1 by a reduction ratio between the motor 401M of the first driving source 401 and the first arm 12, that is, at the joint 171.

Moreover, the first angular velocity sensor 31 detects the angular velocity of the first arm 12 about the first axis of rotation O1. The detection signal of the first angular velocity sensor 31, that is, an angular velocity ωA1 of the first arm 12 about the first axis of rotation O1 detected by the first angular velocity sensor 31 is output to the subtracter 571.

The angular velocity ωA1 and the angular velocity ωA1m are input to the subtracter 571. The subtracter 571 outputs a value ωA1s (=ωA1−ωA1m) obtained by subtracting the angular velocity ωA1m from the angular velocity ωA1 to the conversion section 581. The value ωA1s corresponds to a vibration component of the angular velocity (vibration angular velocity) of the first arm 12 about the first axis of rotation O1. Hereinafter, ωA1s is referred to as vibration angular velocity. In the embodiment, feedback control is performed in which the vibration angular velocity ωA1s (specifically an angular velocity ωm1s in the motor 401M, which is generated based on the vibration angular velocity ωA1s) is multiplied by a gain Ka (described later) and the resultant returns to an input side of the driving source 401. Specifically, the feedback control is performed on the driving source 401 so that the vibration angular velocity ωA1s is as close as possible to 0. Due to this, the vibration of the robot 1 can be suppressed. In the feedback control, the angular velocity of the driving source 401 is controlled.

The conversion section 581 converts the vibration angular velocity ωA1s into the angular velocity ωm1s in the first driving source 401, and outputs the angular velocity ωm1s to the correction value calculation section 591. This conversion can be obtained by multiplying the vibration angular velocity ωA1s by a reduction ratio between the motor 401M of the first driving source 401 and the first arm 12, that is, at the joint 171.

The correction value calculation section 591 multiplies the angular velocity ωm1s by the gain (feedback gain) Ka as a predefined coefficient to obtain a correction value Ka·ωm1s, and outputs the correction value Ka·ωm1s to the adder 601.

The angular velocity ωm1 and the correction value Ka·ωm1s are input to the adder 601. The adder 601 outputs, as the angular velocity feedback value ωfb, a value of adding the angular velocity ωm1 to the correction value Ka·ωm1s to the subtracter 531. A subsequent operation is as described above.

As shown in FIG. 10, in addition to the position command Pc of the second driving source 402, detection signals are input to the second driving source control section 202 from the second position sensor 412 and the second angular velocity sensor 32. Moreover, an angular velocity ωA3m of the arm 14 about the third axis of rotation O3 is input from the third driving source control section 203 to the second driving source control section 202. The second driving source control section 202 drives the second driving source 402 by feedback control using the detection signals so that the rotation angle (the position feedback value Pfb) of the second driving source 402 calculated from the detection signal of the second position sensor 412 is the position command Pc and the angular velocity feedback value ωfb (described later) is the angular velocity command ωc (described later).

That is, the position command Pc and the position feedback value Pfb (described later) from the rotation angle calculation section 552 are input to the subtracter 512 of the second driving source control section 202. In the rotation angle calculation section 552, the number of pulses input from the second position sensor 412 is counted, and the rotation angle of the second driving source 402 according to the count value is output as the position feedback value Pfb to the subtracter 512. The subtracter 512 outputs a deviation between the position command Pc and the position feedback value Pfb (a value obtained by subtracting the position feedback value Pfb from a target value of the rotation angle of the second driving source 402) to the position control section 522.

The position control section 522 performs predetermined arithmetic processing using the deviation input from the subtracter 512, a proportional gain as a predefined coefficient, and the like to thereby compute the target value of the angular velocity of the second driving source 402 according to the deviation. The position control section 522 outputs, as the angular velocity command ωc, a signal indicating the target value (command value) of the angular velocity of the second driving source 402 to the subtracter 532. In this case, although proportional control (P control) is performed as feedback control in the embodiment, it is not limited thereto.

The angular velocity command ωc and the angular velocity feedback value ωfb (described later) are input to the subtracter 532. The subtracter 532 outputs a deviation between the angular velocity command ωc and the angular velocity feedback value ωfb (a value obtained by subtracting the angular velocity feedback value ωfb from the target value of the angular velocity of the second driving source 402) to the angular velocity control section 542.

The angular velocity control section 542 performs predetermined arithmetic processing including integration using the deviation input from the subtracter 532, a proportional gain and an integral gain as predefined coefficients, and the like to thereby generate a driving signal (driving current) of the second driving source 402 according to the deviation, and supplies the signal to the motor 402M via the motor driver 302. In this case, although PI control is performed as feedback control in the embodiment, it is not limited thereto.

In this manner, the feedback control is performed and the driving current of the second driving source 402 is controlled so that the position feedback value Pfb is as equal as possible to the position command Pc and the angular velocity feedback value ωfb is as equal as possible to the angular velocity command ωc. Since the second axis of rotation O2 is perpendicular to the first axis of rotation O1, the operation of the second driving source 402 can be controlled independently of the first driving source 401, without being affected by the operation or vibration of the first arm 12.

Next, the angular velocity feedback value ωfb in the second driving source control section 202 will be described.

In the angular velocity calculation section 562, an angular velocity ωm2 of the second driving source 402 is calculated based on the frequency of a pulse signal input from the second position sensor 412, and the angular velocity ωm2 is output to the adder 602.

In the angular velocity calculation section 562, an angular velocity ωA2m of the second arm 13 about the second axis of rotation O2 is calculated based on the frequency of the pulse signal input from the second position sensor 412, and the angular velocity ωA2m is output to the adder-subtracter 622. The angular velocity ωA2m is a value obtained by dividing the angular velocity ωm2 by a reduction ratio between the motor 402M of the second driving source 402 and the second arm 13, that is, at the joint 172.

In the angular velocity calculation section 563 of the third driving source control section 203, the angular velocity ωA3m of the third arm 14 about the third axis of rotation O3 is calculated based on the frequency of a pulse signal input from the third position sensor 413, and the angular velocity ωA3m is output to the adder-subtracter 622. The angular velocity ωA3m is a value obtained by dividing an angular velocity ωm3 by a reduction ratio between the motor 403M of the third driving source 403 and the third arm 14, that is, at the joint 173.

Moreover, the second angular velocity sensor 32 detects an angular velocity of the third arm 14 about the second axis of rotation O2. The detection signal of the second angular velocity sensor 32, that is, an angular velocity ωA3 of the third arm 14 about the second axis of rotation O2 detected by the second angular velocity sensor 32 is output to the adder-subtracter 622. Since the second axis of rotation O2 and the third axis of rotation O3 are perpendicular to the first axis of rotation O1, the angular velocity of the third arm 14 about the second axis of rotation O2 can be easily and reliably obtained without being affected by the operation or vibration of the first arm 12.

The angular velocity ωA3, the angular velocity ωA2m, and the angular velocity ωA3m are input to the adder-subtracter 622. The adder-subtracter 622 outputs a value ωA2s (=ωA3−ωA2m−ωA3m) obtained by subtracting the angular velocity ωA2m and the angular velocity ωA3m from the angular velocity ωA3 to the conversion section 582. The value ωA2s corresponds to a vibration component of a total of angular velocities (vibration angular velocities) of the second arm 13 and the third arm 14 about the second axis of rotation O2. Hereinafter, ωA2s is referred to as vibration angular velocity. In the embodiment, feedback control is performed in which the vibration angular velocity ωA2s (specifically an angular velocity ωm2s in the motor 402M, which is a value generated based on the vibration angular velocity ωA2s) is multiplied by a gain Ka (described later) and the resultant returns to an input side of the second driving source 402. Specifically, the feedback control is performed on the second driving source 402 so that the vibration angular velocity ωA2s is as close as possible to 0. Due to this, the vibration of the robot 1 can be suppressed. In the feedback control, the angular velocity of the second driving source 402 is controlled.

The conversion section 582 converts the vibration angular velocity ωA2s into the angular velocity ωm2s in the second driving source 402, and outputs the angular velocity ωm2s to the correction value calculation section 592. This conversion can be obtained by multiplying the vibration angular velocity ωA2s by a reduction ratio between the motor 402M of the second driving source 402 and the second arm 13, that is, at the joint 172.

The correction value calculation section 592 multiplies the angular velocity ωm2s by the gain (feedback gain) Ka as a predefined coefficient to obtain a correction value Ka·ωm2s, and outputs the correction value Ka·ωm2s to the adder 602. The gain Ka in the second driving source control section 202 and the gain Ka in the first driving source control section 201 may be the same, or may be different.

The angular velocity ωm2 and the correction value Ka·ωm2s are input to the adder 602. The adder 602 outputs, as the angular velocity feedback value ωfb, a value of adding the angular velocity ωm2 to the correction value Ka·ωm2s to the subtracter 532. A subsequent operation is as described above.

As shown in FIG. 10, in addition to the position command Pc of the third driving source 403, a detection signal is input to the third driving source control section 203 from the third position sensor 413. The third driving source control section 203 drives the third driving source 403 by feedback control using the detection signals so that the rotation angle (the position feedback value Pfb) of the third driving source 403 calculated from the detection signal of the third position sensor 413 is the position command Pc and the angular velocity feedback value ωfb (described later) is the angular velocity command ωc (described later).

That is, the position command Pc and the position feedback value Pfb (described later) from the rotation angle calculation section 553 are input to the subtracter 513 of the third driving source control section 203. In the rotation angle calculation section 553, the number of pulses input from the third position sensor 413 is counted, and the rotation angle of the third driving source 403 according to the count value is output as the position feedback value Pfb to the subtracter 513. The subtracter 513 outputs a deviation between the position command Pc and the position feedback value Pfb (a value obtained by subtracting the position feedback value Pfb from a target value of the rotation angle of the third driving source 403) to the position control section 523.

The position control section 523 performs predetermined arithmetic processing using the deviation input from the subtracter 512, a proportional gain as a predefined coefficient, and the like to thereby compute the target value of the angular velocity of the third driving source 403 according to the deviation. The position control section 522 outputs, as the angular velocity command ωc, a signal indicating the target value (command value) of the angular velocity of the third driving source 403 to the subtracter 533. In this case, although proportional control (P control) is performed as feedback control in the embodiment, it is not limited thereto.

In the angular velocity calculation section 563, the angular velocity of the third driving source 403 is calculated based on the frequency of a pulse signal input from the third position sensor 413, and the angular velocity is output as the angular velocity feedback value ωfb to the subtracter 533.

The angular velocity command ωc and the angular velocity feedback value ωfb are input to the subtracter 533. The subtracter 533 outputs a deviation between the angular velocity command ωc and the angular velocity feedback value ωfb (a value obtained by subtracting the angular velocity feedback value ωfb from the target value of the angular velocity of the third driving source 403) to the angular velocity control section 543.

The angular velocity control section 543 performs predetermined arithmetic processing including integration using the deviation input from the subtracter 533, a proportional gain and an integral gain as predefined coefficients, and the like to thereby generate a driving signal (driving current) of the third driving source 403 according to the deviation, and supplies the signal to the motor 403M via the motor driver 303. In this case, although PI control is performed as feedback control in the embodiment, it is not limited thereto.

In this manner, the feedback control is performed and the driving current of the third driving source 403 is controlled so that the position feedback value Pfb is as equal as possible to the position command Pc and the angular velocity feedback value ωfb is as equal as possible to the angular velocity command ωc.

The driving source control sections 204 to 206 are each similar to the third driving source control section 203, and therefore the description thereof is omitted.

In the robot 1 and the robot system 10 described above, the first angular velocity sensor 31 can detect the angular velocity of the first arm 12. Moreover, since the third axis of rotation O3 is parallel to the second axis of rotation O2, the second angular velocity sensor 32 can detect the angular velocity of the third arm 14 including the rotation of the second arm 13. Then, based on these detection results, vibration can be suppressed.

Even when the posture of the robot 1 is changed, the detection axis of the first angular velocity sensor 31 is constant. Because of this, a correction due to the orientation of the first angular velocity sensor 31 does not need to be performed on the angular velocity of the first arm 12 detected by the first angular velocity sensor 31.

The third axis of rotation O3 and the second axis of rotation O2 are perpendicular to the first axis of rotation O1 or parallel to an axis perpendicular to the first axis of rotation. Therefore, even when the posture of the robot 1 is changed, for example, even when the first arm 12 rotates or the second arm 13 rotates, the detection axis of the second angular velocity sensor 32 is constant. Because of this, a correction due to the orientation of the second angular velocity sensor 32 does not need to be performed on the angular velocity of the third arm 14 detected by the second angular velocity sensor 32.

Due to this, a complex and massive arithmetic operation is not needed, whereby an arithmetic error is unlikely to occur, vibration can be reliably suppressed, and a response speed in the control of the robot 1 can be increased.

Since the second angular velocity sensor 32 does not detect the angular velocity of the second arm 13, but rather detects the angular velocity of the third arm 14 including the rotation of the second arm 13, vibration can be suppressed more reliably.

Compared to the case where an angular velocity sensor is also installed to the second arm 13, the number of angular velocity sensors can be reduced, the cost can be reduced, and the configuration can be simplified.

By controlling the operation of the second driving source 402 that rotates the second arm 13 located on the base end side of the third arm 14, an effect of suppressing the vibration of the robot 1 can be enhanced.

The robot, the robot control device, and the robot system of the invention have been described above based on the embodiment shown in the drawings. However, the invention is not limited thereto, and the configuration of each part can be replaced with any configuration having a similar function. Moreover, any other configuration may be added to the invention.

Examples of the motors of the driving sources include, in addition to the servomotor, for example, a stepping motor. When a stepping motor is used as the motor, for example, a sensor that measures the number of driving pulses to be input to the stepping motor and thereby detects the rotation angle of the motor may be used as a position sensor.

The types of the position sensors and the angular velocity sensors are not particularly limited. Examples thereof include, for example, optical, magnetic, electromagnetic, and electrical types.

In the embodiment, the operation of the second driving source that rotates the second arm is controlled based on the detection result of the second angular velocity sensor. However, the invention is not limited thereto. For example, the operation of the third driving source that rotates the third arm may be controlled based on the detection result of the second angular velocity sensor.

In the embodiment, the number of axes of rotation of the robot is six. However, the invention is not limited thereto. The number of axes of rotation of the robot may be three, four, five, or seven or more.

That is, in the embodiment, since the wrist has two arms, the number of arms of the robot is six. However, the invention is not limited thereto. The number of arms of the robot may be three, four, five, or seven or more.

In the embodiment, the robot is a single-arm robot having an arm-coupled body including a plurality of arms that are rotatably coupled to each other. However, the invention is not limited thereto. For example, the robot may be a robot having a plurality of the arm-coupled bodies, such as a dual-arm robot having two arm-coupled bodies each including a plurality of arms that are rotatably coupled to each other.

The entire disclosure of Japanese Patent Application No. 2012-191462 filed Aug. 31, 2012 is expressly incorporated by reference herein.

What is claimed is:

1. A robot comprising:
   a base;
   a first arm rotatably coupled to the base about a first axis of rotation, wherein the first axis of rotation coincides with a line normal to an installation surface of the base;
   a second arm rotatably coupled to the first arm about a second axis of rotation, the second axis of rotation being perpendicular to the first axis of rotation or being parallel to an axis perpendicular to the first axis of rotation;
   a third arm rotatably coupled to the second arm about a third axis of rotation, the third axis of rotation being parallel to the second axis of rotation;
   a first angular velocity sensor installed to the first arm at a joint between the base and the first arm and having an angular velocity detection axis parallel to the first axis of rotation; and a second angular velocity sensor installed to the third arm at a joint between the second arm and the third arm and having an angular velocity detection axis parallel to the third axis of rotation.

2. The robot according to claim 1, further comprising:

a first angular velocity sensor unit having a first housing, the first angular velocity sensor, and a circuit section, the first angular velocity sensor and the circuit section being disposed in the first housing, the circuit section AD-converting a signal output from the first angular velocity sensor and transmitting the signal; and a second angular velocity sensor unit having a second housing, the second angular velocity sensor, and a circuit section, the second angular velocity sensor and the circuit section being disposed in the second housing, the circuit section AD-converting a signal output from the second angular velocity sensor and transmitting the signal, wherein the first angular velocity sensor unit is installed to the first arm, and the second angular velocity sensor unit is installed to the third arm.

3. The robot according to claim 2, wherein the first housing and the second housing each have a rectangular parallelepiped outer shape, the angular velocity detection axis of the first angular velocity sensor coincides with a first line normal to a largest surface of the rectangular parallelepiped of the first housing, and the angular velocity detection axis of the second angular velocity sensor coincides with a second line normal to a largest surface of the rectangular parallelepiped of the second housing.

4. The robot according to claim 2, wherein the first housing has a first mount portion mounted to the first arm at a corner of the first housing, and the second housing has a second mount portion mounted to the third arm at a corner of the second housing.

5. The robot according to claim 4, wherein a first fixing member having conductivity and fixing the mount portion of the first housing to the first arm is provided and the circuit section of the first angular velocity sensor unit is grounded to the first arm through the fixing member, and a second fixing member having conductivity and fixing the mount portion of the second housing to the third arm is provided and the circuit section of the second angular velocity sensor unit is grounded to the third arm through the fixing member.

6. The robot according to claim 2, wherein the first arm has a case and an arm-side mount portion formed integrally with the case, and the first angular velocity sensor unit is directly mounted to the arm-side mount portion.

7. The robot according to claim 2, wherein the third arm has a case and an arm-side mount portion formed integrally with the case, and the second angular velocity sensor unit is directly mounted to the arm-side mount portion.

8. The robot according to claim 1, further comprising a cable installed in the first arm and supplying electric power to the robot, and wherein the first angular velocity sensor is arranged at an end portion of the first arm on a side opposite to the cable.

9. The robot according to claim 1, further comprising a cable installed in the third arm and supplying electric power to the robot, and wherein the second angular velocity sensor is arranged at an end portion of the third arm on a side opposite to the cable.

10. The robot according to claim 1, further comprising:

a fourth arm rotatably coupled to the third arm about a fourth axis of rotation, the fourth axis of rotation being perpendicular to the third axis of rotation or being parallel to an axis perpendicular to the third axis of rotation;

a fifth arm rotatably coupled to the fourth arm about a fifth axis of rotation, the fifth axis of rotation being perpendicular to the fourth axis of rotation or being parallel to an axis perpendicular to the fourth axis of rotation; and a sixth arm rotatably coupled to the fifth arm about a sixth axis of rotation, the sixth axis of rotation being perpendicular to the fifth axis of rotation or being parallel to an axis perpendicular to the fifth axis of rotation.

11. A robot system comprising:

the robot according to claim 1; and a robot control device controlling operation of the robot.

12. A robot control device controlling operation of a robot including a base, a first arm rotatably coupled to the base about a first axis of rotation, a second arm rotatably coupled to the first arm about a second axis of rotation, the second axis of rotation being perpendicular to the first axis of rotation or being parallel to an axis perpendicular to the first axis of rotation, and a third arm rotatably coupled to the second arm about a third axis of rotation, the third axis of rotation being parallel to the second axis of rotation, the robot control device comprising:

a reception section receiving a first signal and a second signal, the first signal being output from a first angular velocity sensor, the first angular velocity sensor being installed to the first arm at a joint between the base and the first arm and having an angular velocity detection axis parallel to the first axis of rotation, the second signal being output from a second angular velocity sensor, the second angular velocity sensor being installed to the third arm at a joint between the second arm and the third arm and having an angular velocity detection axis parallel to the third axis of rotation;

an arithmetic section obtaining, based on the first signal and the second signal received by the reception section, a vibration component of an angular velocity of the first arm and a vibration component of an angular velocity of the third arm; and a control section controlling the operation of the robot based on the vibration component of the angular velocity of the first arm and the vibration component of the angular velocity of the third arm obtained by the arithmetic section.

* * * * *